United States Patent
Kim et al.

(10) Patent No.: US 7,991,441 B2
(45) Date of Patent: Aug. 2, 2011

(54) SWING HINGE DEVICE OF A PORTABLE TERMINAL AND DUAL HINGE DEVICE HAVING THE SAME

(75) Inventors: Jin-Soo Kim, Suwon-si (KR); Jae-Chul Jin, Suwon-si (KR); Ki-Taek Kim, Yongin-si (KR); Yun-Cheol Kang, Gunpo-si (KR); Jun-Young Lee, Yongin-si (KR); Sung-Wook Kang, Seoul (KR)

(73) Assignee: Samsung Electronics Co., Ltd (KR)

( * ) Notice: Subject to any disclaimer, the term of this patent is extended or adjusted under 35 U.S.C. 154(b) by 779 days.

(21) Appl. No.: 11/944,122

(22) Filed: Nov. 21, 2007

(65) Prior Publication Data

US 2008/0132301 A1 Jun. 5, 2008

(30) Foreign Application Priority Data

Nov. 23, 2006 (KR) .................. 10-2006-0116365
Nov. 6, 2007 (KR) .................. 10-2007-0112640

(51) Int. Cl.
*H04M 1/00* (2006.01)
(52) U.S. Cl. ............... 455/575.3; 455/575.1; 455/575.4; D14/126; D14/132; D14/127
(58) Field of Classification Search ............... 455/575.1, 455/575.3, 575.4; D14/126, 132, 137–138 AD
See application file for complete search history.

(56) References Cited

U.S. PATENT DOCUMENTS

| | | | | |
|---|---|---|---|---|
| D552,064 S | * | 10/2007 | Kim et al. ............... | D14/138 AB |
| 7,280,857 B2 | * | 10/2007 | Geernaert ................. | 455/575.4 |
| 7,492,893 B2 | * | 2/2009 | Ahn et al. ................. | 379/433.13 |
| 7,546,150 B2 | * | 6/2009 | Makino ..................... | 455/575.1 |
| D597,999 S | * | 8/2009 | Kim et al. ............... | D14/138 AB |
| 7,587,226 B2 | * | 9/2009 | Makino ..................... | 455/575.3 |
| 7,671,841 B2 | * | 3/2010 | Lee et al. ................. | 345/158 |
| 2004/0224732 A1 | * | 11/2004 | Lee et al. ................. | 455/575.3 |
| 2005/0288075 A1 | * | 12/2005 | Geernaert ................. | 455/575.4 |
| 2006/0030381 A1 | | 2/2006 | Byun et al. | |
| 2006/0146030 A1 | | 7/2006 | Kim | |
| 2006/0172764 A1 | * | 8/2006 | Makino ..................... | 455/550.1 |
| 2007/0123309 A1 | * | 5/2007 | Sano et al. ................. | 455/566 |
| 2007/0293283 A1 | * | 12/2007 | Inubushi et al. ........... | 455/575.1 |
| 2008/0045279 A1 | * | 2/2008 | Ohki ....................... | 455/575.1 |
| 2008/0051162 A1 | * | 2/2008 | Kim et al. ................. | 455/575.3 |
| 2008/0146295 A1 | * | 6/2008 | Jorgensen et al. ........ | 455/575.3 |
| 2008/0194303 A1 | * | 8/2008 | Takagi et al. ............... | 455/575.3 |

FOREIGN PATENT DOCUMENTS

CN 1816065 8/2006

(Continued)

*Primary Examiner* — Edward Urban
*Assistant Examiner* — Fayyaz Alam
(74) *Attorney, Agent, or Firm* — The Farrell Law Firm, P.C.

(57) ABSTRACT

A swing hinge device of a portable terminal that can move in a straight line or a curved direction when a folder rotates is provided. The portable terminal includes a body housing, a display unit, a folder rotating about first and second hinge axes on the body housing, and a connection member rotatively connecting the folder with the body housing. The swing hinge device includes a base member coupled to the connection member; a rotation member coupled to the folder; first and second guide pins; a first guide member coupled to the first guide pin, for guiding the straight movement of the first guide pin when the rotation member rotates about the second hinge axis; and a second guide member, coupled to the second guide pin, for guiding the curved movement of the second guide pin when the rotation member rotates about the second hinge axis.

22 Claims, 29 Drawing Sheets

FOREIGN PATENT DOCUMENTS

| | | |
|---|---|---|
| EP | 1 475 943 | 11/2004 |
| EP | 1 533 679 | 5/2005 |
| EP | 1 686 768 | 8/2006 |
| JP | 2006-191632 | 7/2006 |
| JP | 2006-211576 | 8/2006 |
| KR | 1020060070524 | 6/2006 |

* cited by examiner

SWING HINGE DEVICE OF A PORTABLE TERMINAL AND DUAL HINGE DEVICE HAVING THE SAME

PRIORITY

This application claims priority under 35 U.S.C. §119(a) to a Korean Patent Application filed in the Korean Industrial Property Office on Nov. 23, 2006 and assigned Serial No. 2006-116365, and a Korean Application filed on Nov. 6, 2007 and assigned serial No. 2007-112640, the disclosures of each of which are hereby incorporated by reference.

BACKGROUND OF THE INVENTION

1. Field of the Invention

The present invention relates to a swing hinge device of a portable terminal, which can move in a straight line or along a curved direction.

2. Description of the Related Art

Generally, the term "portable terminals" refers to devices which a user can carry with him/her and perform wireless communication with another user. Such portable terminals may be classified into various types according to their appearance, such as bar-type portable terminals, flip-type portable terminals, and folder-type portable terminals. The bar-type portable terminal has a single housing shaped like a bar. The flip-type portable terminal has a flip panel that is pivotally mounted to a bar-shaped housing by a hinge unit. The folder-type portable terminal has a folder coupled to a single bar-shaped housing by a hinge unit in such a manner that the folder can be rotated in order to be folded on or unfolded from the housing.

Further, portable terminals may be classified as rotation-type terminals and sliding-type terminals according to the way of opening and closing the terminals. In the rotation-type portable terminal, two housings are coupled to each other in a manner such that one housing rotates to be opened or closed relative to the other while facing each other. In the sliding-type portable terminal, two housings are coupled to each other in a manner such that one housing slides to be opened or closed relative to the other. The various classifications of portable terminals are understood by those skilled in the art.

To increase portability, the various types of conventional portable terminals have been developed in favor of lightness and compactness, and also are useful for voice or image communication with another user.

Although mobile communication services continue to diversify, and portable terminals have been developed as multimedia devices, the portable terminals have not diverged from the conventional folder-type and sliding-type. Further, as the use of the portable terminal increases in popularity, users' tastes also become more varied. However, the conventional types of the portable terminals fail to satisfy user's various tastes.

A display swing-type portable terminal has been developed in order to solve the above-mentioned problem.

In the display swing-type portable terminal, a display unit can be rotated in a landscape mode in order to watch a video.

As shown in FIG. 1, the display swing-type portable terminal includes a body housing 10 with a first hinge axis A1, a folder 20, and a connection member 30. The body housing 10 is provided with different key buttons 11 and a microphone 12 mounted thereon. The connection member 30 connects the folder 20 to the body housing 10 and allows the folder 20 to rotate about the first hinge axis A1 in a direction of approaching or departing from the body housing 10. In addition, the connection member 30 has a second hinge axis, to which the folder is rotatively connected while facing the connection member 30. The folder 30 is provided with a display unit 21, and a speaker 22.

In the conventional display swing-type portable terminal, however, a rotation space D1 between the body housing and the folder is required, in which corners of the rectangular display unit can rotate when the folder is opened about the first hinge axis in order to rotate the display unit of the folder. Since the rotation axis of the display unit is located at the center portion of the folder, the rotation space is unnecessarily present when the folder rotates. Further, as the display unit increases in size, the rotation space D1 also increases, which increases of the size of the portable terminal and deteriorates the compactness of the portable terminal.

In addition, if the display unit has an increased size, the rotation axis is located at an upper portion of the folder. Thus, there is a disadvantage in that the folder topples down, even when the folder is put on a desk or a floor.

SUMMARY OF THE INVENTION

Accordingly, the present invention has been made to solve the above-mentioned problems occurring in the prior art, and the present invention provides a swing hinge device of a portable terminal, which can move along straight line or along a curved direction and by which a folder can be located adjacent to a body housing in order to reduce an unnecessary rotation space required to rotate the folder, thereby miniaturizing the portable terminal.

Further, the present invention provides a dual hinge device of a portable terminal, which can rotate the display unit and keypad of the portable terminal selectively according to the use of the portable terminal, thereby improving the use of the portable terminal.

Furthermore, the present invention provides a swing hinge device of a portable terminal, which can move in a straight line or along a curved direction and can be applied to various kinds of portable terminals.

In accordance with an aspect of the present invention, there is provided a swing hinge device of a portable terminal including a body housing, a display unit, a folder rotating about first and second hinge axes on the body housing, and a connection member providing the first and second hinge axes and rotatively connecting the folder with the body housing so that the folder rotates about the first and second hinge axes. The swing hinge device includes a base member coupled to the connection member; a rotation member coupled to the folder; first and second guide pins provided on the rotation member; a first guide member disposed on the base member and coupled to the first guide pin, for guiding the straight movement of the first guide pin when the rotation member rotates about the second hinge axis; a second guide member disposed on the base member and coupled to the second guide pin, for guiding the curved movement of the second guide pin when the rotation member rotates about the second hinge axis, and moving the second hinge axis along with the second guide pin so that the display unit of the folder is located at the center portion of the connection member; and power supply means interposed between the first and second guide members, for providing force for the straight or curved movement of the first and second guide pins.

In accordance with another aspect of the present invention, there is provided a dual hinge device of a portable terminal including a body housing, a display unit, a folder rotating about first, second and third hinge axes on the body housing, and dual connection members providing the first, second and third hinge axes and rotatively connecting the folder with the body housing so that the folder rotates about the first, second and third hinge axes. The dual hinge device comprises base members coupled to the dual connection members, respectively; rotation members coupled to the folder and the body housing, respectively; first and second guide pins provided on each rotation member; first guide members disposed on the base members and coupled to the first guide pins, for guiding the straight movement of the first guide pins when the rotation members rotate about the second and third hinge axes; second guide members disposed on the base members and coupled to the second guide pins, for guiding the curved movement of the second guide pins when the rotation members rotate about the second and third hinge axes, and moving the second and third hinge axes along with the second guide pins so that the body housing and the folder are located at the center portions of the connection members, respectively; and power supply means interposed between the first and second guide members, for providing force for the straight or curved movement of the first and second guide pins.

In accordance with still another aspect of the present invention, there is provided a swing hinge device of a portable terminal including a body housing, a display unit, and a swing housing swinging on the body housing while facing the body housing. The swing hinge device includes a base member coupled to the body housing; a rotation member coupled to the swing housing; first and second guide pins provided on the rotation member; a first guide member disposed on the base member and coupled to the first guide pin, for guiding the straight movement of the first guide pin when the rotation member rotates about a second hinge axis; a second guide member disposed on the base member and coupled to the second guide pin, for guiding the curved movement of the second guide pin when the rotation member rotates about the second hinge axis, and moving the second hinge axis along with the second guide pin so that the display unit of the swing housing is located at the center portion of the body housing; and power supply means interposed between the first and second guide members, for providing force for the straight or curved movement of the first and second guide pins.

In accordance with still another aspect of the present invention, there is provided a swing hinge device of a portable terminal including a body housing, a display unit, a folder adapted to rotate away from the body housing about first and second hinge axes, and a connection member providing the first and second hinge axes and connecting the folder so as to rotate about the first and second hinge axes, the swing hinge device including a base member fastened to the connection member; a rotation member fastened to the folder; first and second guide pins coupled to the rotation member through the base member; first and second guide members provided on the base member so that, when the rotation member is rotated about the second hinge axis, the first guide pin is semi-automatically moved along a curve and the second guide pin is semi-automatically moved in a straight line; and a number of force supply means positioned inside the base member and coupled to the first and second guide pins to provide force so that the first and second guide pins semi-automatically move along the curve or in the straight line.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, a first embodiment of the present invention will be described in detail with reference to the accompanying drawings.

Figure 1:
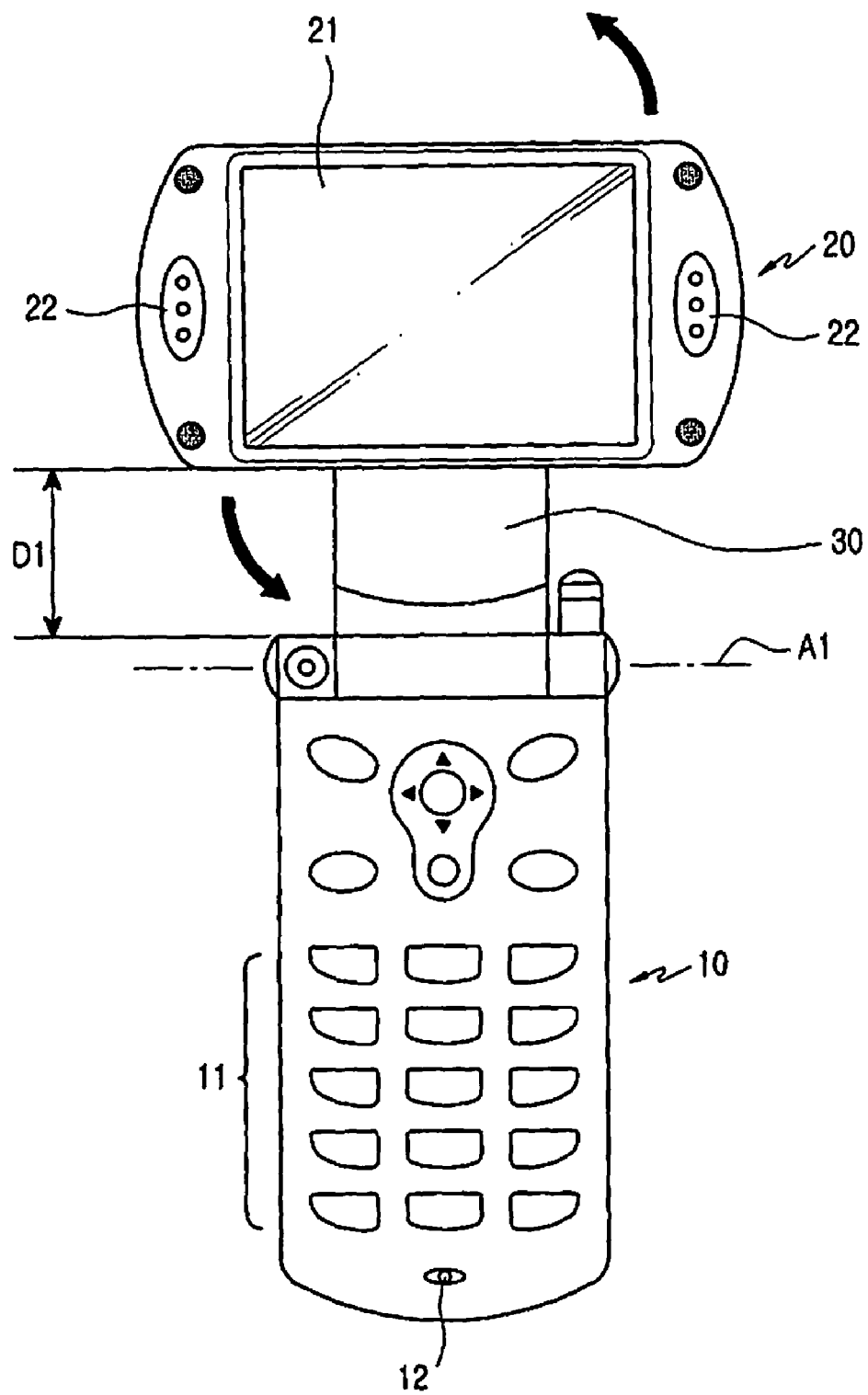
FIG. 1 is a front view showing a conventional folder-type portable terminal, in which the folder of the portable terminal, having a display unit, rotates.
Figure 2:
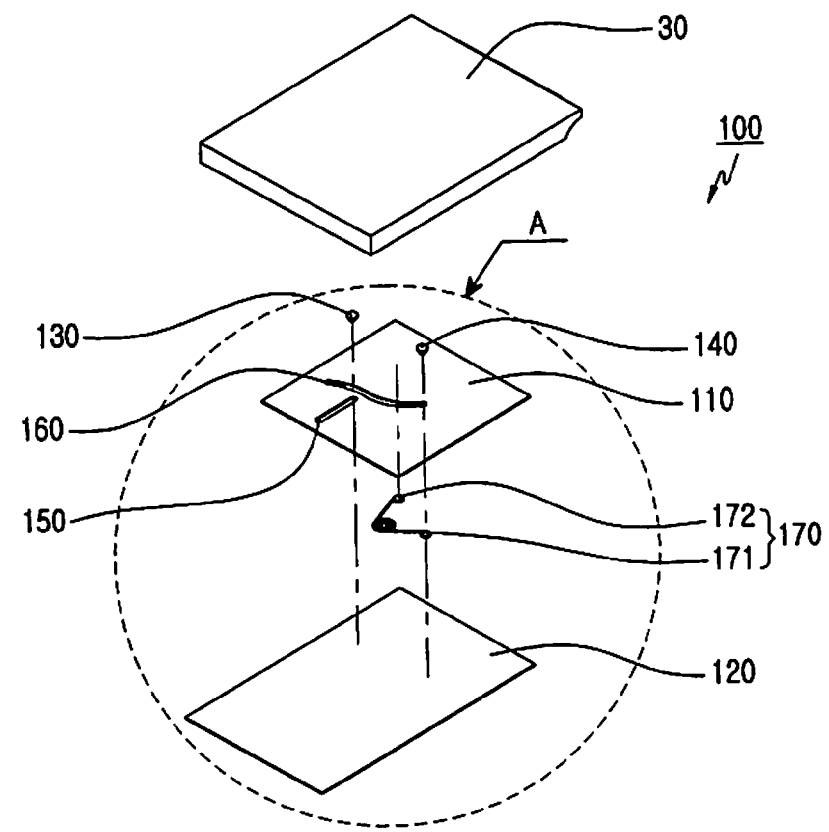
FIG. 2 is an exploded perspective view showing the configuration of a swing hinge device of a portable terminal according to as first embodiment of the present invention.
Figure 2:
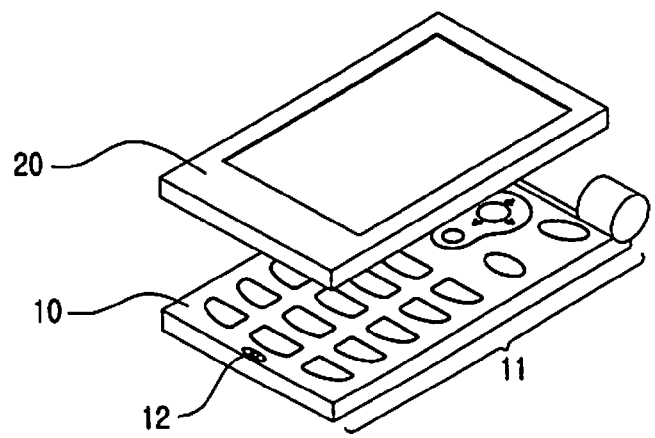

As shown in FIG. 2, a portable terminal includes a body housing 10, a folder 20, and a connection member 30.

As shown in FIGS. 2, 3, 5, and 6, a swing hinge device 100 of the portable terminal includes a base member 110, a rotation member 120, first and second guide pins 130 and 140, first and second guide members 150 and 160, and a power supply member 170. The base member 110 is coupled to the connection member 30 to support the rotation of the rotation member 120, as described below. The rotation member 120 is mounted on the folder 20 and is rotatively coupled to the base member 110. The first and second guide pins 130 and 140 extend through the first and second guide members 150 and 160, as described below, respectively, and are mounted on the rotation member 120. The first guide member 150 is coupled to the first guide pin 130 and provided in the base member 110, so as to guide the straight movement of the first guide pin 130 when the rotation member 120 rotates about the second hinge axis A2. The second guide member 160 is coupled to the second guide pin 140 in order to guide the curved movement of the second guide pin 140 when the rotation member 120 rotates about the second hinge axis A2, and also makes the second hinge axis A2 move curvedly along with the second guide pin 140. Further, the second guide member 160 is disposed on the base member 110 so that a display unit 21 of the folder 20 is located at the center portion of the connection member 30. The power supply member 170 is disposed between the first and second guide members 150 and 160 and supplies force to the first and second guide pins 130 and 140 in order to move the first and second guide pins 130 and 140 straightly or curvedly.

Figure 4:
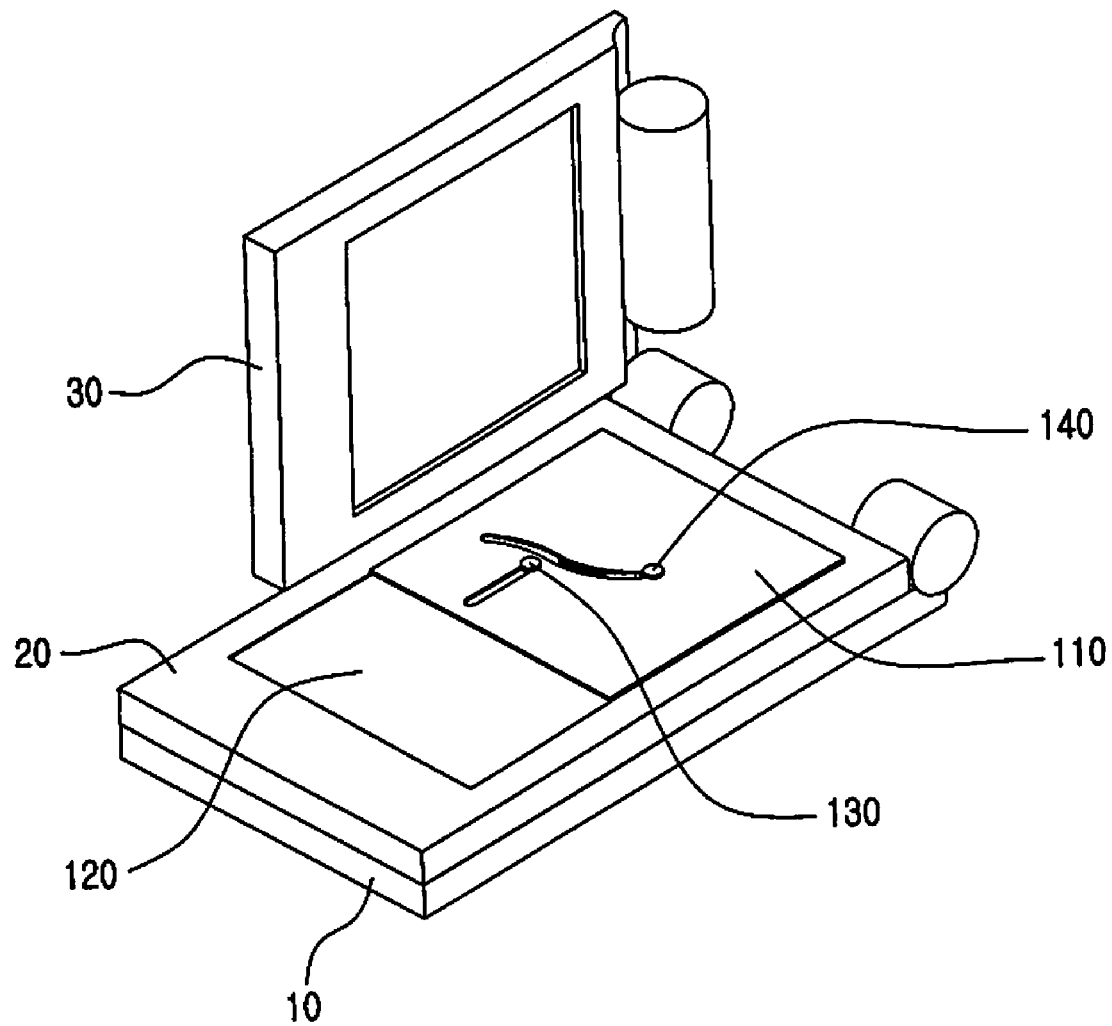
FIG. 4 is a perspective view showing the swing hinge device of the portable terminal according to the first embodiment of the present invention, before the swing hinge device is assembled with the folder.

As shown in FIGS. 2 and 4, the first guide member 150 includes a first guide hole 150 through which the first guide pin 130 extends. The first guide hole 150 is linearly formed in a lengthwise direction of the folder 20.

Figure 3:
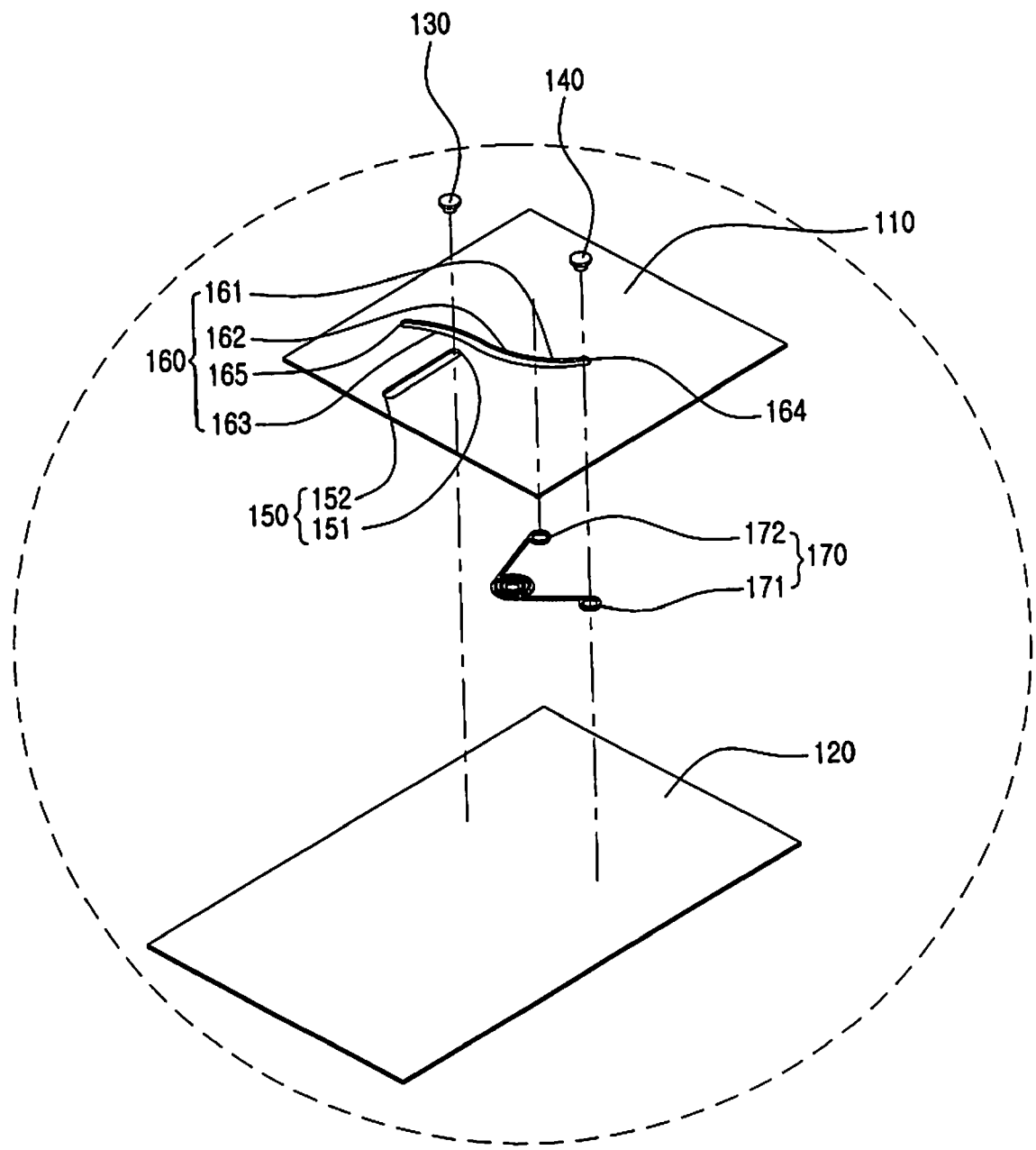
FIG. 3 is an exploded perspective view showing the swing hinge device marked by a circle A in FIG. 2.

As shown in FIGS. 3 and 4, the first guide hole 150 has a first stopper 151 formed at one end thereof, which makes contact with the first guide pin 130 to stop the straight movement of the first guide pin 130 at a position where the rotation of the folder 20 is finished, and a second stopper 152 formed at the other end thereof, which stops the straight movement of the first guide pin 130 after the folder 20 rotates by 90 degrees.

As shown in FIG. 3, the second guide member 160 includes a second guide hole 160 through which the second guide pin 140 extends. The second guide hole 160 has a first curved guide 161 formed at a portion thereof in order to guide the curved movement of the second guide pin 140 when the folder 20 rotates.

In this state, as shown in FIGS. 7, 8, 9 and 10, the second guide hole 160 has a second curved guide 163 placed opposite to the first curved guide 161 so that the second guide pin 140 moves along the first curved guide 161 and then passes by an inflection point 162 formed at the center portion of the second guide hole 160 when the folder 20 is rotated by 90 degrees.

Figure 10:
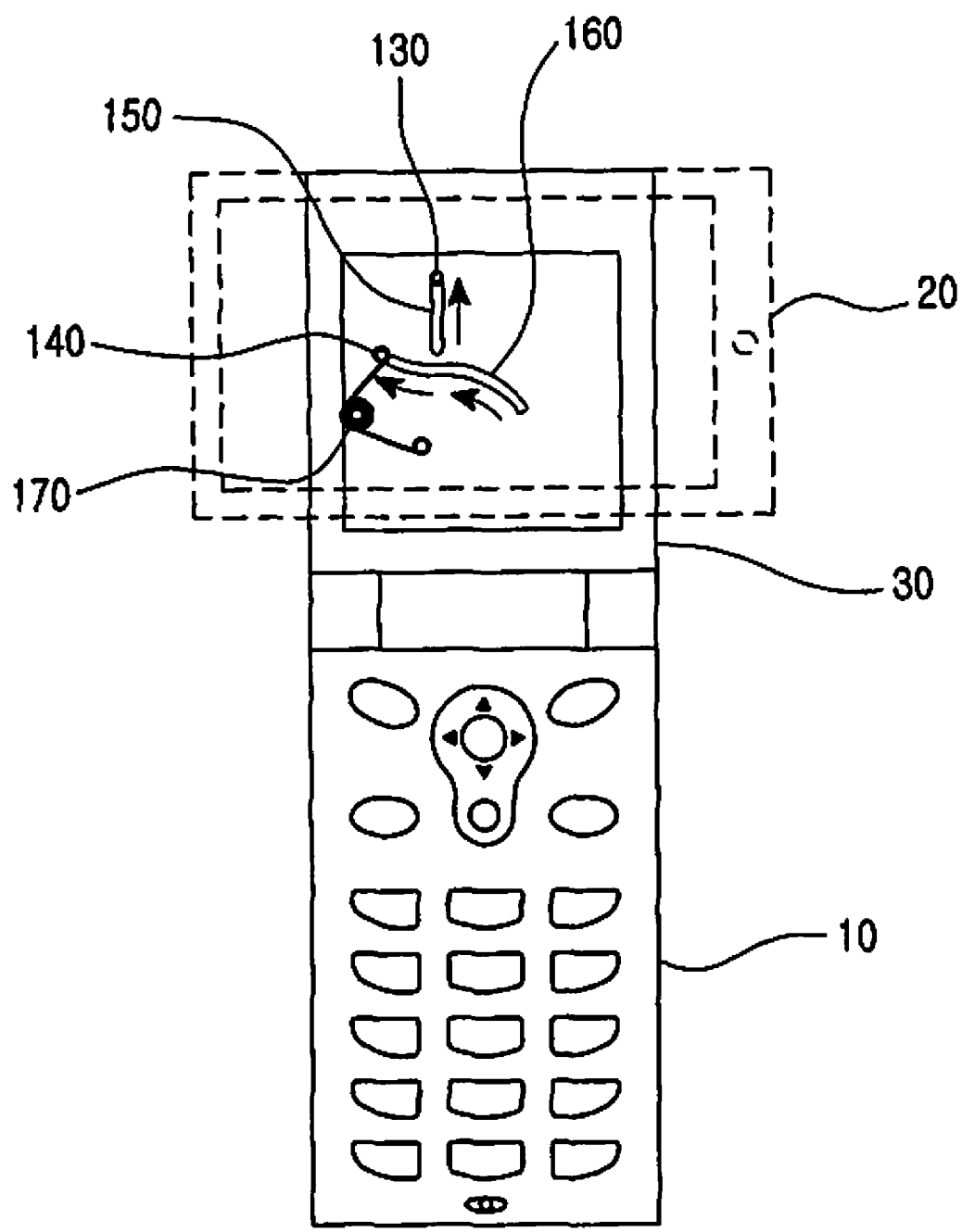
FIG. 10 is a front view showing the swing hinge device of the portable terminal according to the first embodiment, in which the folder is rotated at an angle of 90 degrees by the swing hinge device.

As shown in FIG. 10, the second guide hole 160 is formed in an 'S' shape.

As shown in FIGS. 7, 8, 9 and 10, the first curved guide 161 has a first stopper 164 formed at one end thereof, which makes contact with the second guide pin 140 to stop the movement of the folder 20 at a position where the rotation of the folder 20 is terminated. The second curved guide 163 also has a second stopper 165 formed at one end thereof, which makes contact with the second guide pin 140 to stop the movement of the folder 20 when the folder 20 rotates by 90 degrees.

Figure 7:
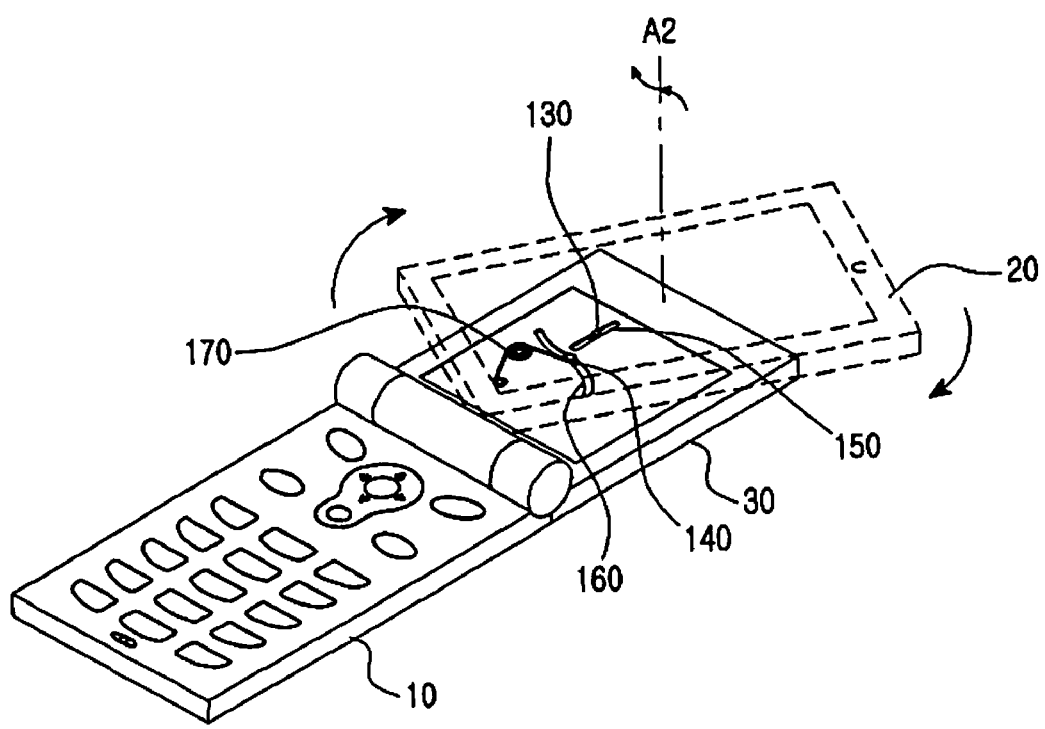
FIG. 7 is a perspective view showing the swing hinge device of the portable terminal according to the first embodiment of the present invention, in which swing hinge device rotates the folder.
Figure 8:
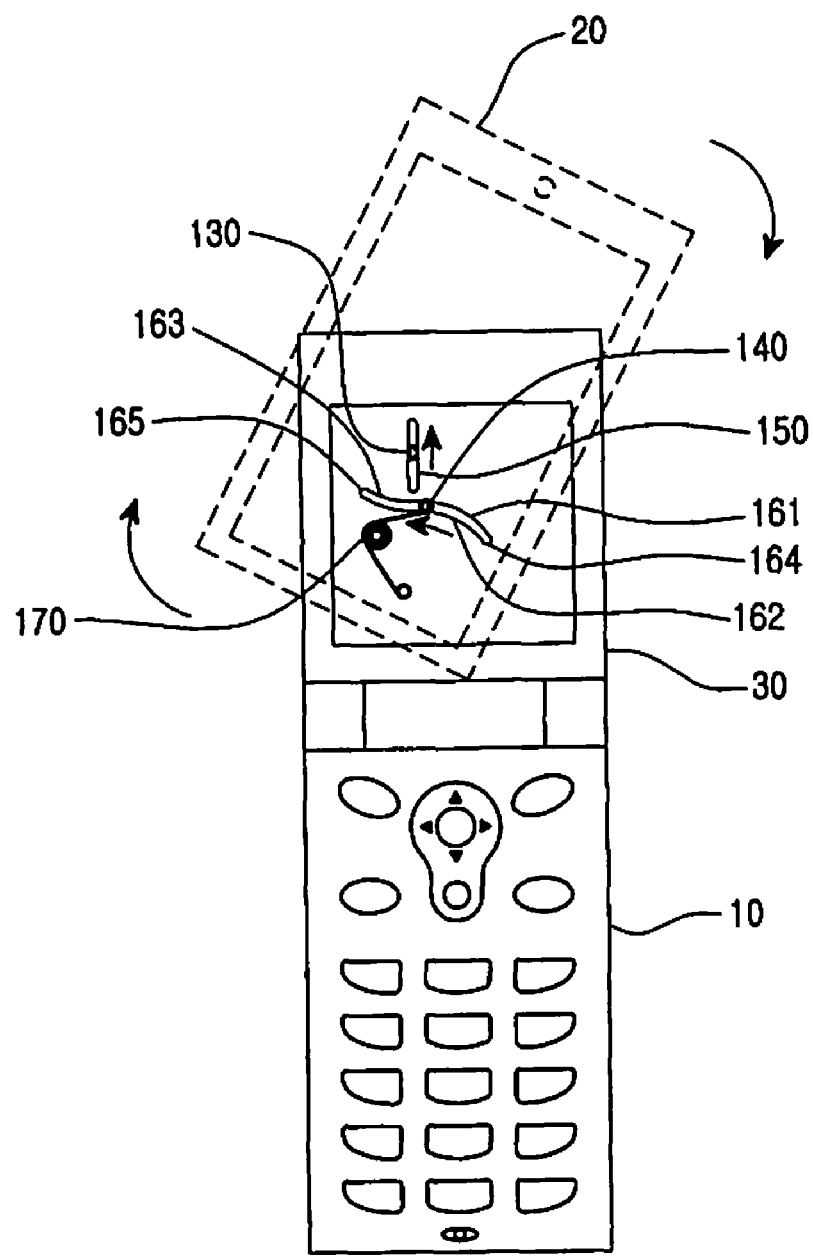
FIG. 8 is a front view showing the swing hinge device of the portable terminal according to the first embodiment of the present invention, in which the swing hinge device rotates the folder.

As shown in FIGS. 7 and 8, the power supply member 170 includes an elastic member 170. The elastic member 170 has one end 171 connected to the second guide pin 140, and the other end 172 coupled to the base member 110 to move along a predetermined trajectory as the second guide pin 140 rotates.

The operation of the swing hinge device of the portable terminal constructed as described above according to the first embodiment of the present invention will be described in detail with reference to FIGS. 2 through 10.

As shown in FIG. 2, the portable terminal includes the body housing 10, the folder 20, and the connection member 30.

As shown in FIGS. 2, 3 and 4, the swing hinge device 100 of the portable terminal includes the base member 110, the rotation member 120, the first and second guide pins 130 and 140, the first and second guide members 150 and 160, and power supply means 170. The first and second guide pins 130 and 140 extend through the first and second guide members 150 and 160 disposed on the base member 110, respectively, and then are coupled to the rotation member 120. The first and second guide members 150 and 160 include the first and second guide holes. At this time, the power supply means 170 is connected to the first and second guide members 150 and 160. The power supply means 170 includes an elastic member 170, which has one end 171 connected to the second guide pin 140 and the other end 172 coupled to the base member 110.

In this state, as shown in FIG. 2, the base member 110 is fixed to the connection member 30, and the rotation member 120 is attached to the folder 20.

Figure 5:
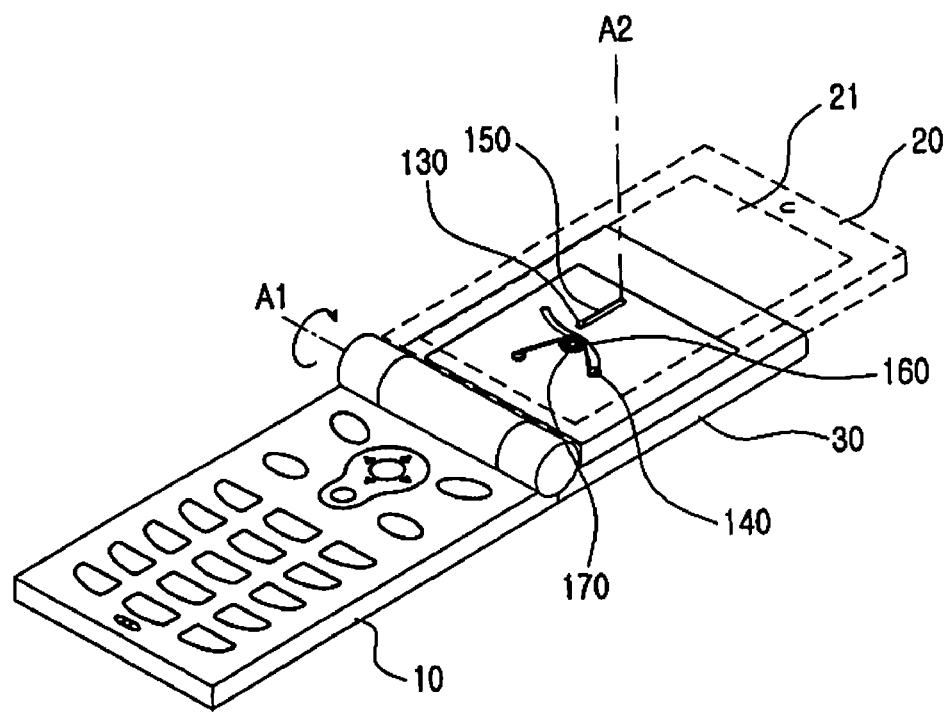
FIG. 5 is a perspective view showing the swing hinge device of the portable terminal according to the first embodiment of the present invention, in which the folder is open.
Figure 6:
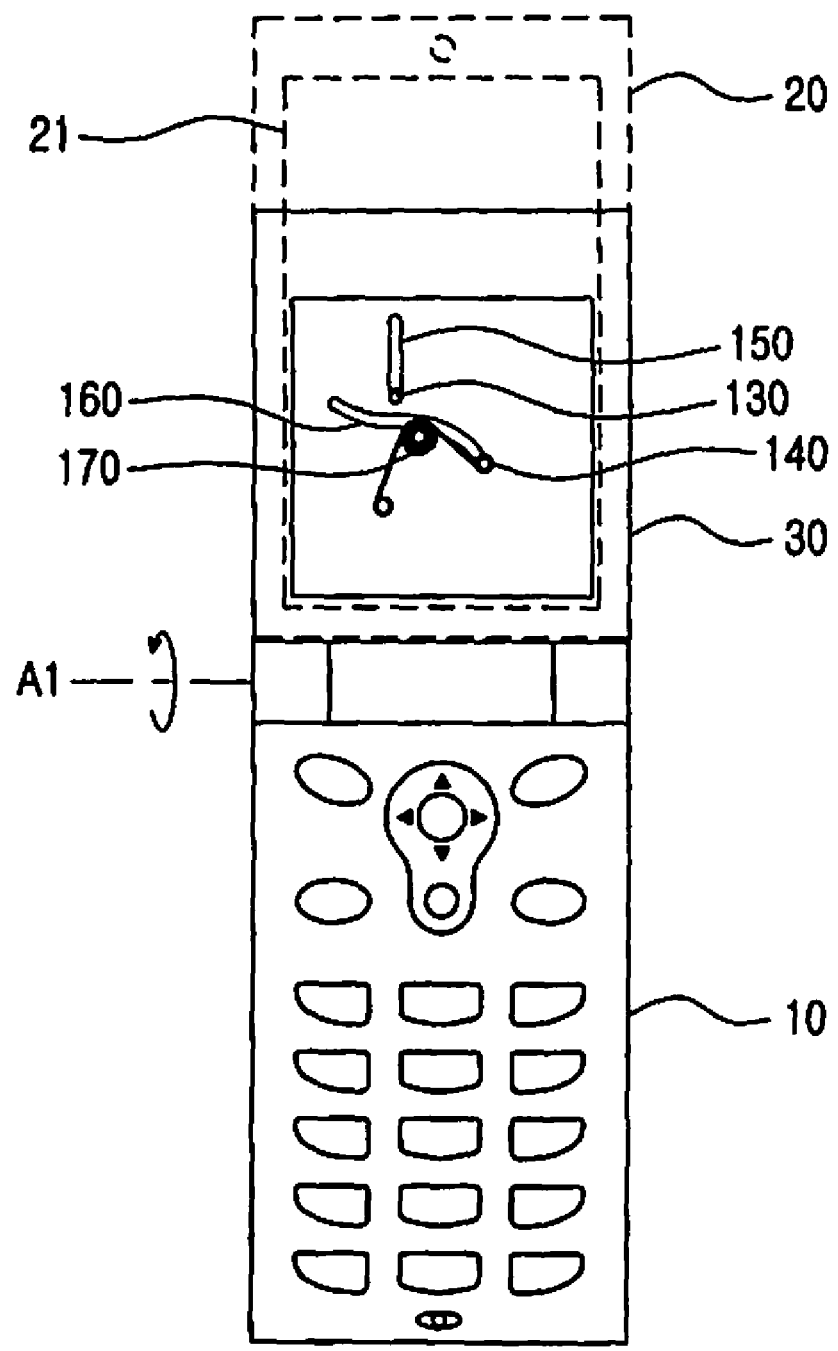
FIG. 6 is a front view showing the swing hinge device of the portable terminal according to the first embodiment of the present invention, in which the folder is open.

As shown in FIGS. 5 and 6, therefore, the folder 20 can rotate about the first hinge axis A1 of the connection member 30 to be away from the body housing 10.

As shown in FIGS. 7 and 8, the folder 20 rotates about the second hinge axis A2 clockwise.

At this time, the first guide pin 130 moves in a straight line along the first guide hole 150, and the second guide pin 140 moves in a curved direction along the first curved guide 161 of the second guide hole 160.

When the first and second guide pins 130 and 140 move to the intermediate portions of the first and second guide holes 150 and 160, respectively, the second guide pin 140 passes by the inflection point 162 formed at the intermediate portion of the second guide hole 160, and moves along the second curved guide 163 formed to be opposite to the first curved guide 161. Simultaneously, the first guide pin 130 also moves in a straight line along the first guide hole 150.

Figure 9:
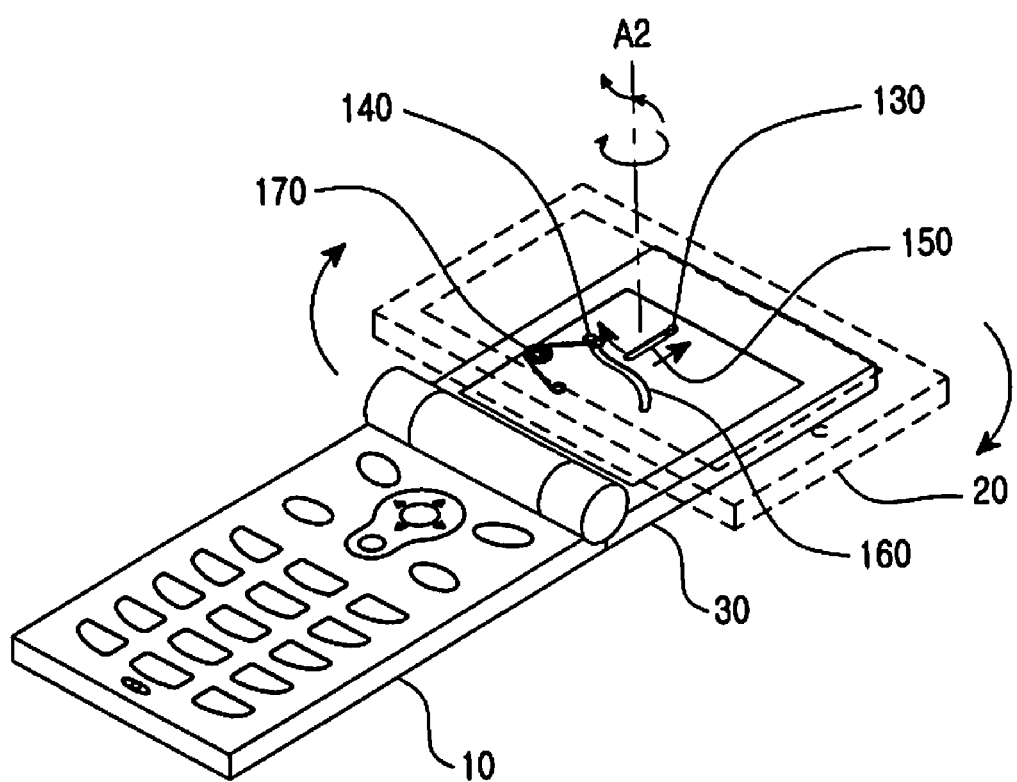
FIG. 9 is a perspective view showing the swing hinge device of the portable terminal according to the first embodiment, in which the folder is rotated at an angle of 90 degrees by the swing hinge device.

As shown in FIGS. 9 and 10, the folder 20 rotates by 90 degrees and is arranged in a landscape direction.

At this time, the elastic member 170 provides elasticity for the first and second guide pins 130 and 140 so that the first and second guide pins 130 and 140 move in a straight line or in a curved direction along the first and second guide holes 150 and 160, respectively. The elastic member 170 moves together with the second guide pin 140 along a predetermined trajectory as the second guide pin 140 moves.

The second guide hole 160 is formed in 'S' shape so that the second guide pin 140 moves along s curved direction.

As shown in FIGS. 7, 8, 9 and 10, the first guide hole 150 has the first stopper 151 formed at one end thereof, which makes contact with the first guide pin 130 to stop the straight movement of the first guide pin 130 at a position where the rotation of the folder 20 is terminated, and the second stopper 152 formed at the other end thereof, which stops the straight movement of the first guide pin 130 when the folder 20 rotates by 90 degrees. Therefore, when the folder 20 rotates by 90 degrees, the first guide pin 130 simultaneously makes contact with the second stopper 152, resulting in the straight movement of the first guide pin 130 being stopped by the second stopper 152.

Further, the second curved guide 163 has the second stopper 165 formed at one end thereof, which stops the rotation of the folder 20 when the folder 20 rotates by 90 degrees. Thus, when the folder rotates by 90 degrees, the second guide pin 140 makes contact with the second stopper 165, resulting in the curved movement of the second guide pin 140 being stopped by the second stopper 165.

As shown in FIGS. 5 and 6, when the folder 20 is subjected to rotation force, the folder 20 rotates about the second axis A2 counterclockwise. Simultaneously, the first and second guide pins 130 and 140 are released from the first and second stoppers 151 and 152, respectively. The first guide pin 130 moves straightly along the first guide hole 150, and the second guide pin 140 moves curvedly along the second curved guide 163. Then, the first guide pin 130 makes contact with the first stopper 151 formed at one end of the first guide hole 150, at one end thereof, and its straight movement is stopped.

Simultaneously, the second guide pin 140 passes by the inflection point 162 and moves curvedly along the first curved guide 161. Then, the second guide pin 140 makes contact with the first stopper 164 formed in the first curved guide 161 and its curved movement is stopped.

The elastic member 170 provides elasticity for the first and second guide pins 130 and 140, so that the first and second guide pins 130 and 140 move in a straight line or along a curved direction.

Hereinafter, the operation of the dual hinge devices of the portable terminal according to a second embodiment of the present invention will be described in detail with reference to FIGS. 11 through 18.

Figure 11:
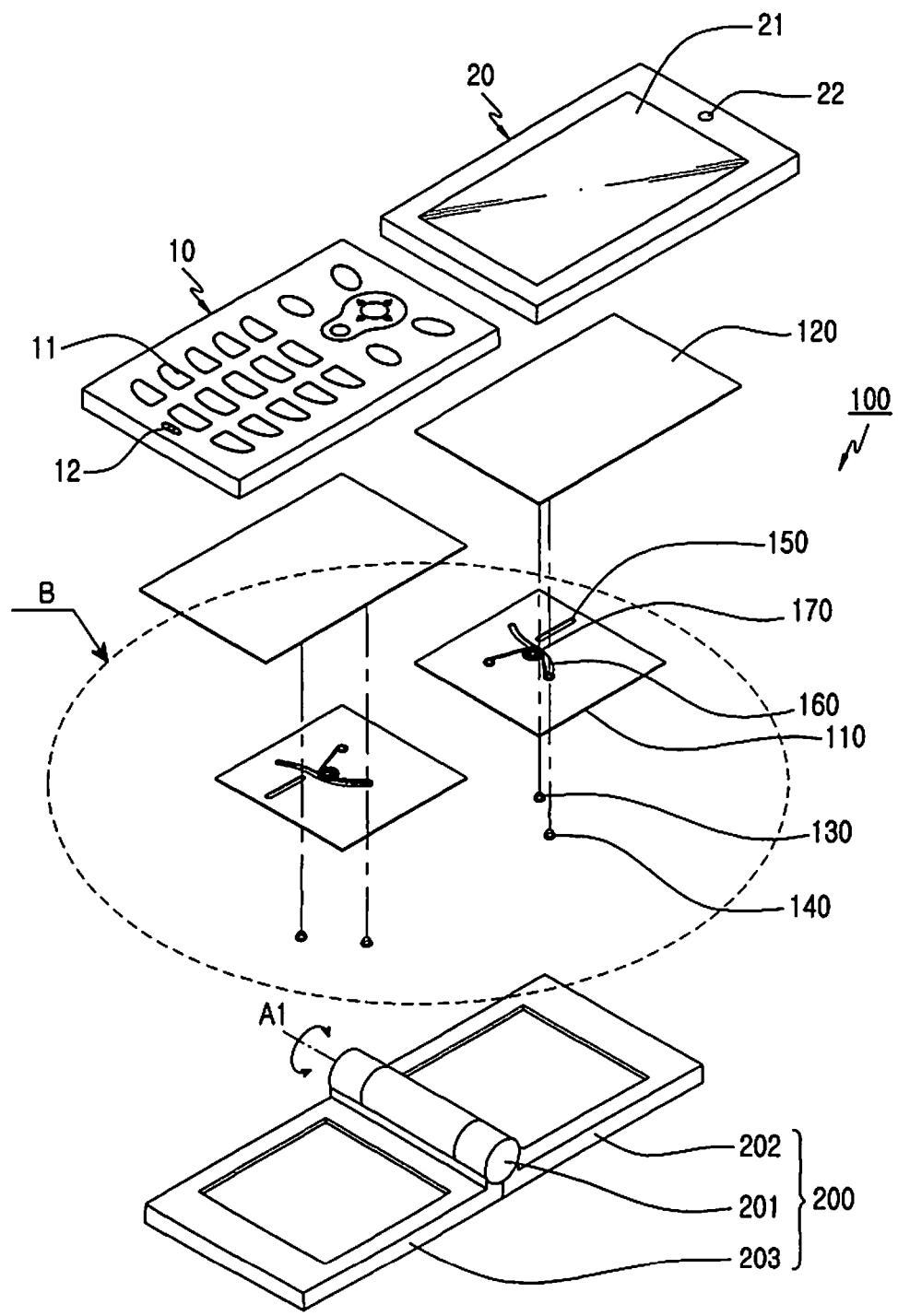
FIG. 11 is a perspective view showing the configuration of the dual hinge devices of a portable terminal according to a second embodiment of the present invention.
Figure 12:
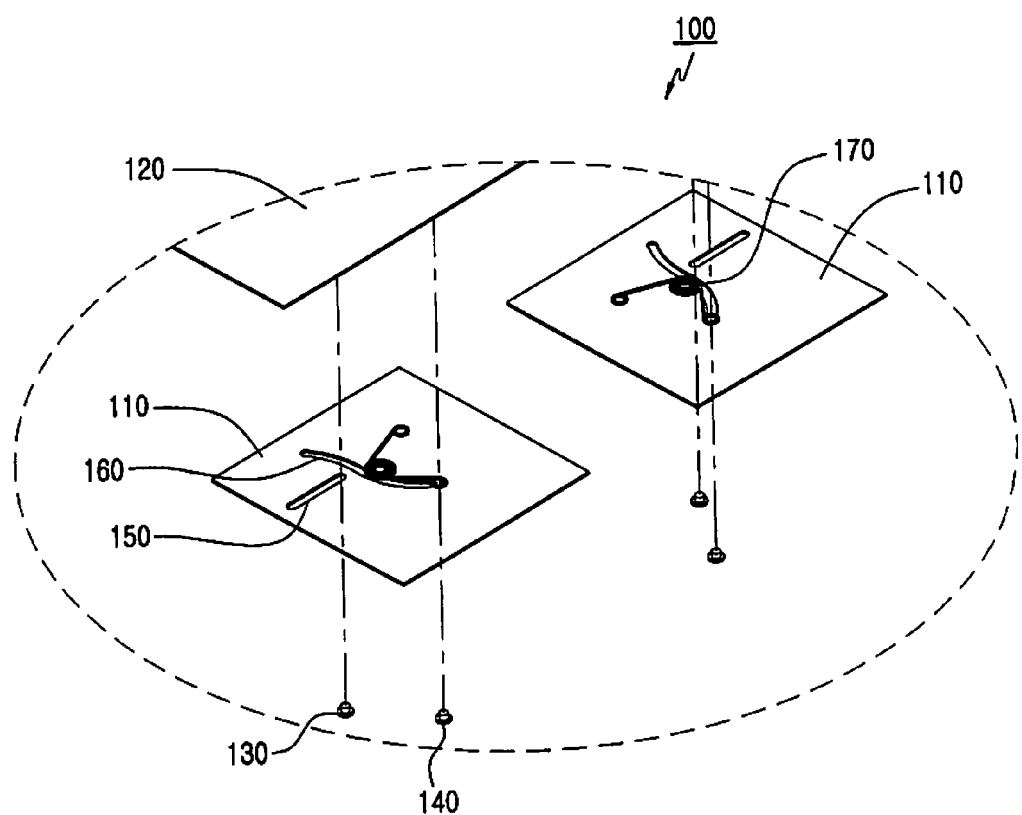
FIG. 12 is an exploded perspective view showing the dual hinge devices marked by a circle B in FIG. 11.
Figure 13:
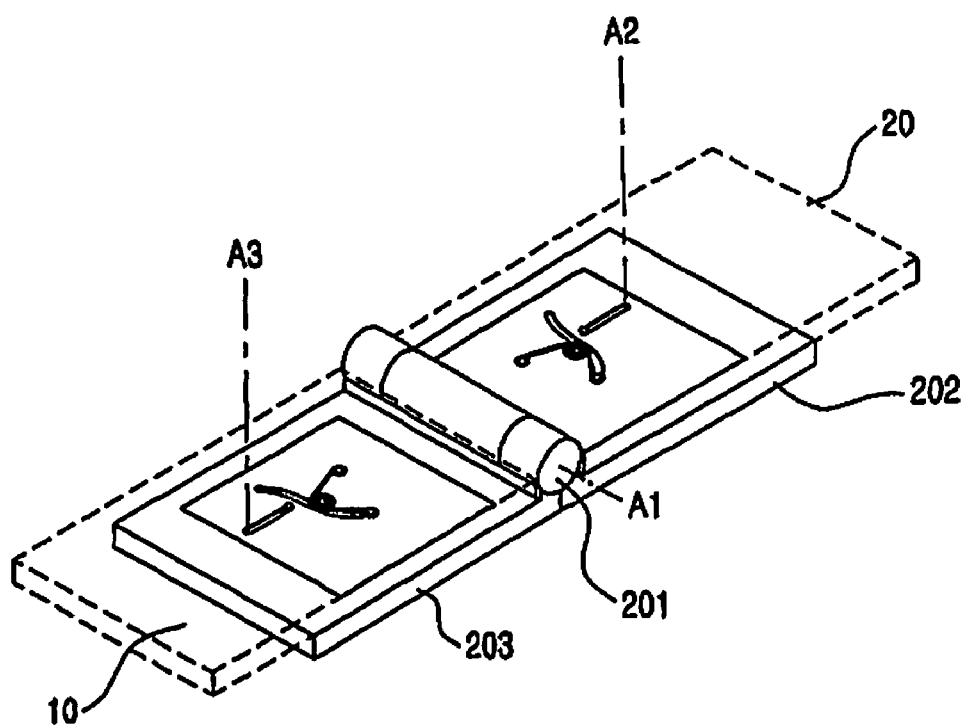
FIG. 13 is a perspective view showing the combination of the dual hinge devices of the portable terminal according to the second embodiment of the present invention.

As shown in FIGS. 11, 12, and 13, the portable terminal includes a body housing 10, a folder 20, and dual connection members 200. The dual connection members 200 includes first, second and third connection members 201, 202 and 203. The second and third connection members 202 and 203 are connected with each other by means of the first connection member 201 to rotate about the first hinge axis A1.

As shown in FIGS. 11 and 12, dual hinge devices 100 of the portable terminal includes base members 110, rotation members 120, first and second guide pins 130 and 140, first and second guide members 150 and 160, and power supply means 170. The first and second guide pins 130 and 140 extend through the first and second guide members 150 and 160 formed in the base members 110, respectively, and are coupled to the rotation members 120, respectively. The first and second guide members 150 and 160 include the first and second guide holes.

As shown in FIG. 12, the power supply means 170 is provided for the first and second guide members 150 and 160, and includes elastic members 170. Each elastic member 170 has one end connected to the second guide pin 140, and the other end coupled to the base member 110.

In this state, as shown in FIG. 11, the base members 110 are attached to the second and third connection members 202 and 203, respectively, and the rotation members 120 are respectively coupled to the body housing 10 and the folder 20.

Figure 14:
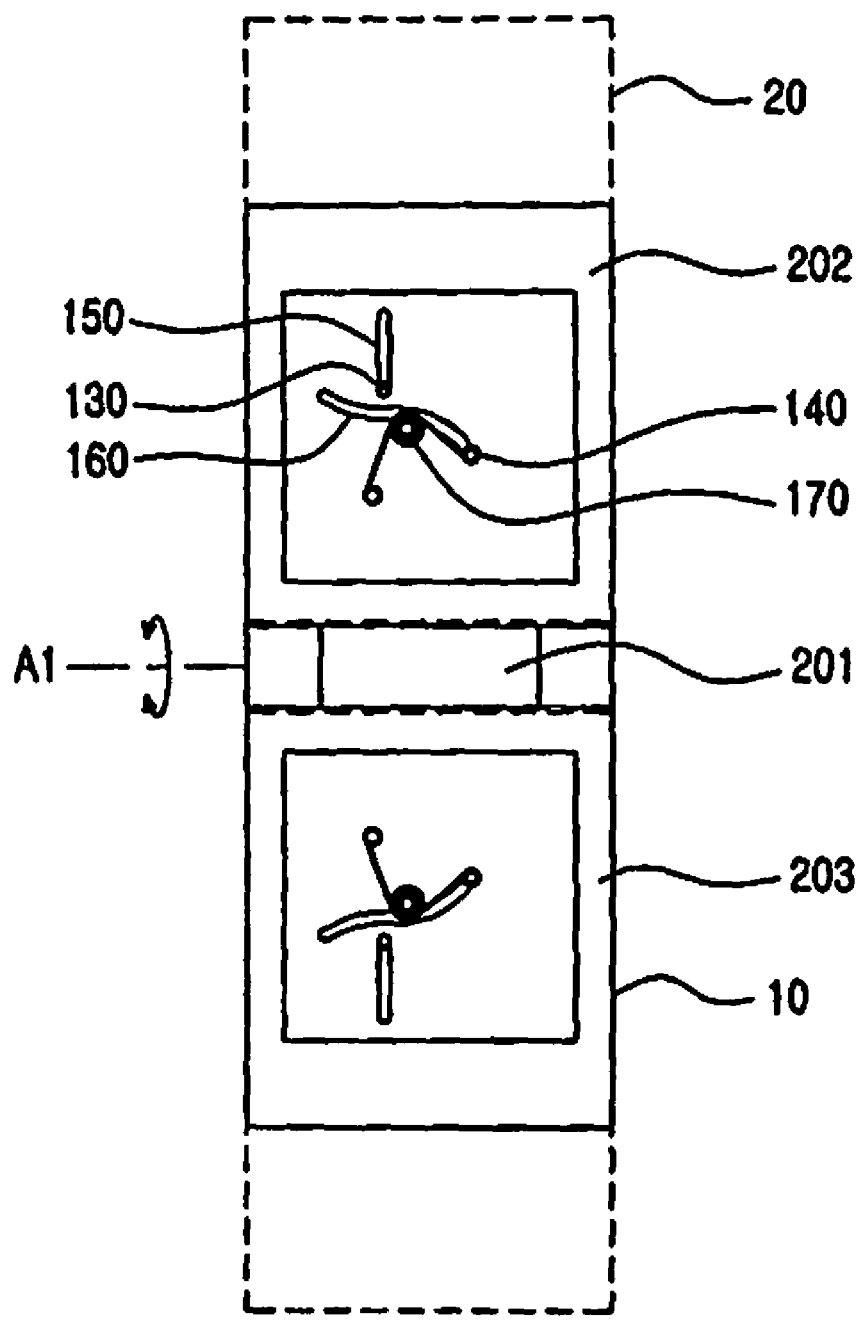
FIG. 14 is a front view showing the combination of the dual hinge devices of the portable terminal according to the second embodiment of the present invention.

As shown in FIGS. 13 and 14, when the portable terminal is used in a communication mode, the folder 20 rotates about the first hinge axis A1 of the first connection member to be away from the body housing 10.

As shown in FIGS. 15 to 18, when a user plays games and watches TV or video using a display unit 21 and a keypad 11, the body housing and the folder 20 are rotated clockwise about the second and third hinge axis A2 and A3, respectively.

Figure 15:
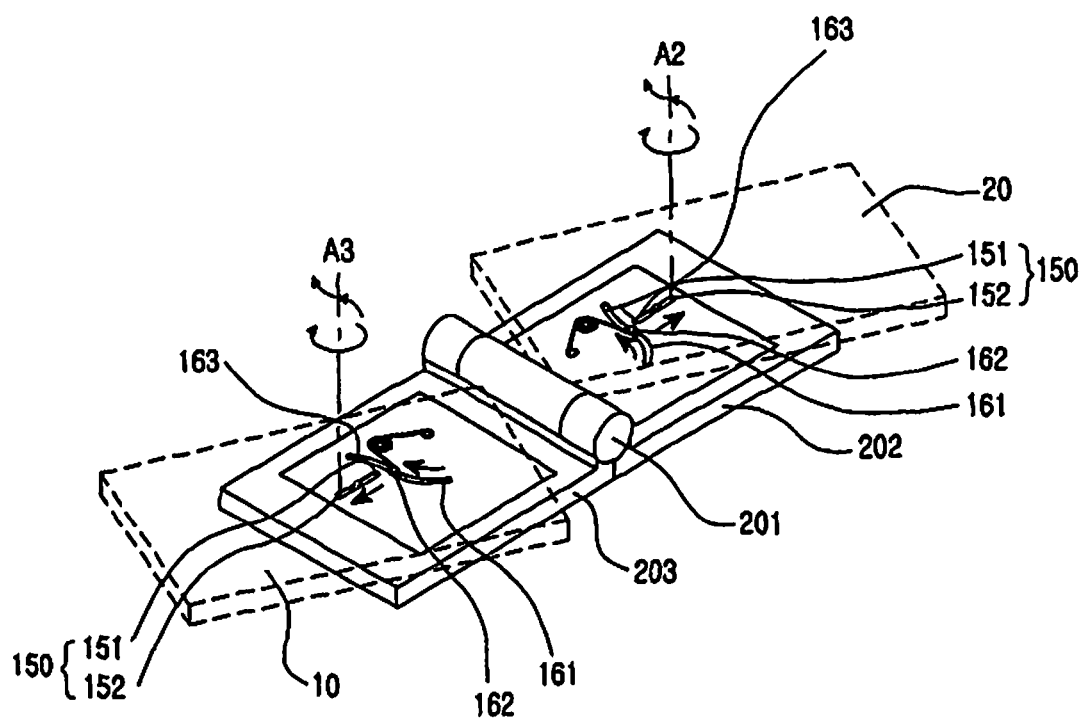
FIG. 15 is a perspective view showing the portable terminal according to the second embodiment of the present invention, in which the dual hinge devices rotate the body housing and the folder of the portable terminal.
Figure 16:
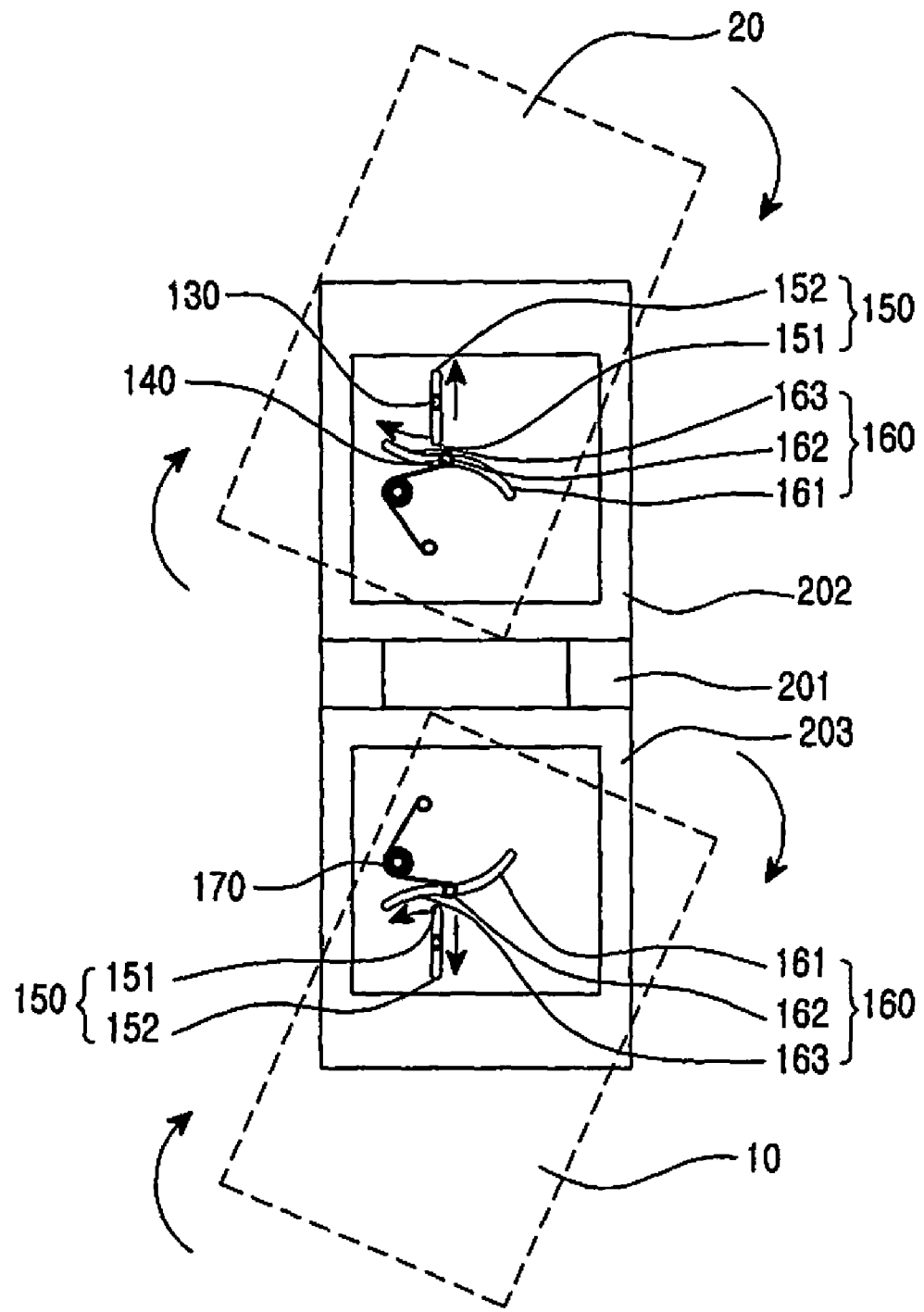
FIG. 16 is a front view showing the portable terminal according to the second embodiment of the present invention, in which the dual hinge devices rotate the body housing and the folder of the portable terminal.
Figure 17:
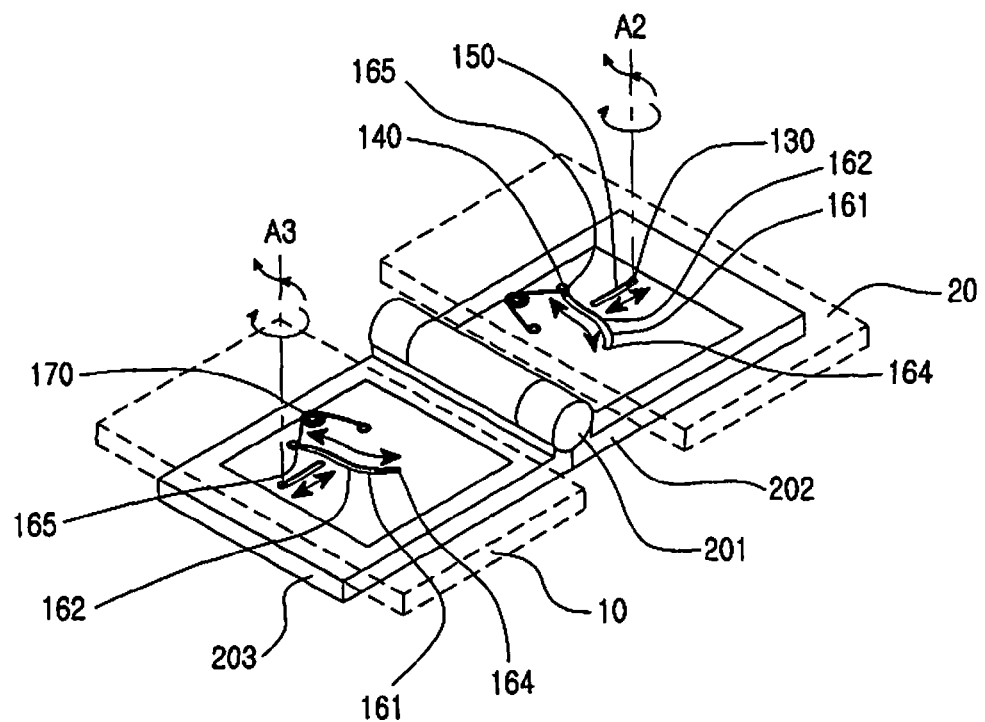
FIG. 17 is a perspective view showing the portable terminal according to the second embodiment of the present invention, in which the body housing and the folder of the portable terminal are rotated by 90 degrees.
Figure 18:
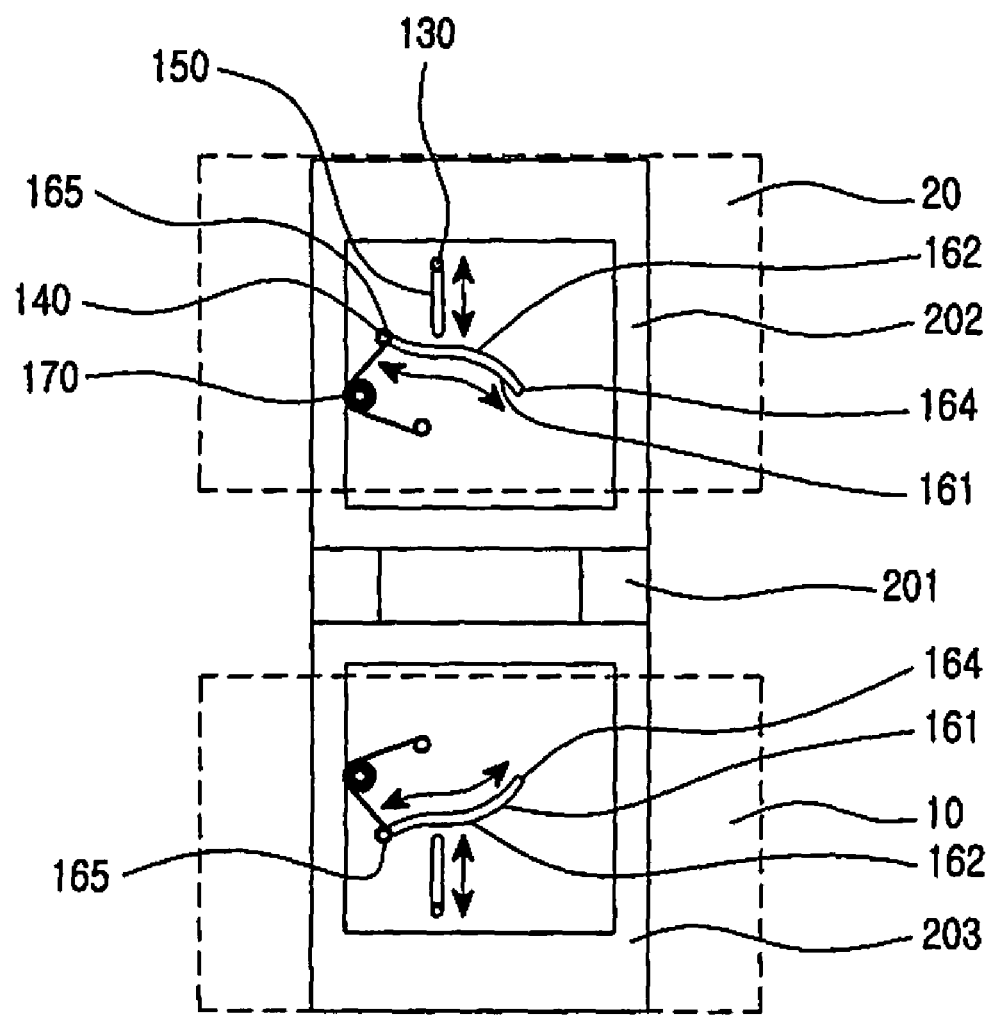
FIG. 18 is a front view showing the portable terminal according to the second embodiment of the present invention, in which the body housing and the folder of the portable terminal are rotated by 90 degrees.

At this time, the first guide pins 130 move straightly along the first guide hole 150, and the second guide pins 140 move curvedly along a first curved guide 161 of the second guide hole 160. As shown in FIGS. 15 and 16, when the first and second guide pins 130 and 140 move to the intermediate portion of the first and second guide holes 150 and 160, respectively, the second guide pins 140 pass by the inflection points 162 of the second guide holes 160, respectively, and move along the second curved guide 163 formed to be opposite to the first curved guide 161. Simultaneously, the first guide pins 130 also move straightly along the first guide holes 150, respectively. As shown in FIGS. 17 and 18, the body housing 10 and the folder 20 rotate by 90 degrees and are arranged in a landscape mode.

The elastic members 170 provide elasticity for the first and second guide pins 130 and 140 so that the first and second guide pins 130 and 140 move in a straight line or along a curved direction along the first and second guide holes 150 and 160, respectively. The elastic members 170 move together with the second guide pin 140 along a predetermined trajectory as the second guide pin 140 rotates.

As shown in FIGS. 15 and 16, the second and third hinge axes A2 and A3 move together in a straight line. The first guide holes 150 respectively have a first stopper 151 formed at one end thereof, which makes contact with the first guide pin 130 and stops the straight movements of the body housing 10 and the folder 20 at positions where the rotation of the body housing 10 and the folder 20 is terminated, and a second stopper 152 formed at the other end thereof, which stops the straight movement of the first guide pin 130. When the body housing 10 and the folder 20 rotate by 90 degrees, the first guide pins 130 simultaneously make contact with the second stoppers 152, respectively, so as to stop the straight movement of the first guide pins 130.

At the same time, as shown in FIGS. 17 and 18, the second curved guide 163 has second stoppers 165 formed at one end thereof, which stop the rotation of the body housing 10 and the folder 20 when the body housing 10 and the folder 20 rotate by 90 degrees. Similarly, when the body housing 10 and the folder 20 rotate by 90 degrees, the second guide pins 140 make contact with the second stoppers 165, respectively, so as to stop the curved movement of the body housing 10 and the folder 90.

As shown in FIGS. 17 and 18, when the body housing 10 and the folder 20 move straightly or curvedly about the second and third hinge axes A2 and A3, the body housing 10 and the folder 20 are arranged in a shape of 'H' rotated by 90 degrees.

In this state, the user uses the keypad arranged on the body housing with both hands, and thereby facilitates the playing of a game or use of other functions.

Here, when the body housing 10 and the folder 20 rotate from the landscape mode to a portrait mode again, the first and second guide pins 130 and 140 are released from the second stoppers 152 and 165. In addition, the first guide pins 130 also move in a straight line along the first guide holes 150, respectively, and the second guide pins 140 move in a curved direction along the second curved guides 163, respectively. The first guide pins 130 make contact with the first stoppers 151 formed at one end of the first guide holes 150, respectively, and its straight movement is stopped. The second guide pins 140 pass by inflection points 162 and move in a curved direction along the first curved guides 161, respectively. Then, the second guide pins 140 make contact with the first stoppers 164 formed in the first curved guides 161, respectively, and its curved movement is stopped. The elastic members 170 provide elasticity for the straight or curved movement of the first and second guide pins 130 and 140.

Hereinafter, the operation of the swing hinge device of the swing-type portable terminal according to a third embodiment of the present invention will be described in detail with reference to FIGS. 19 and 20.

Figure 19:
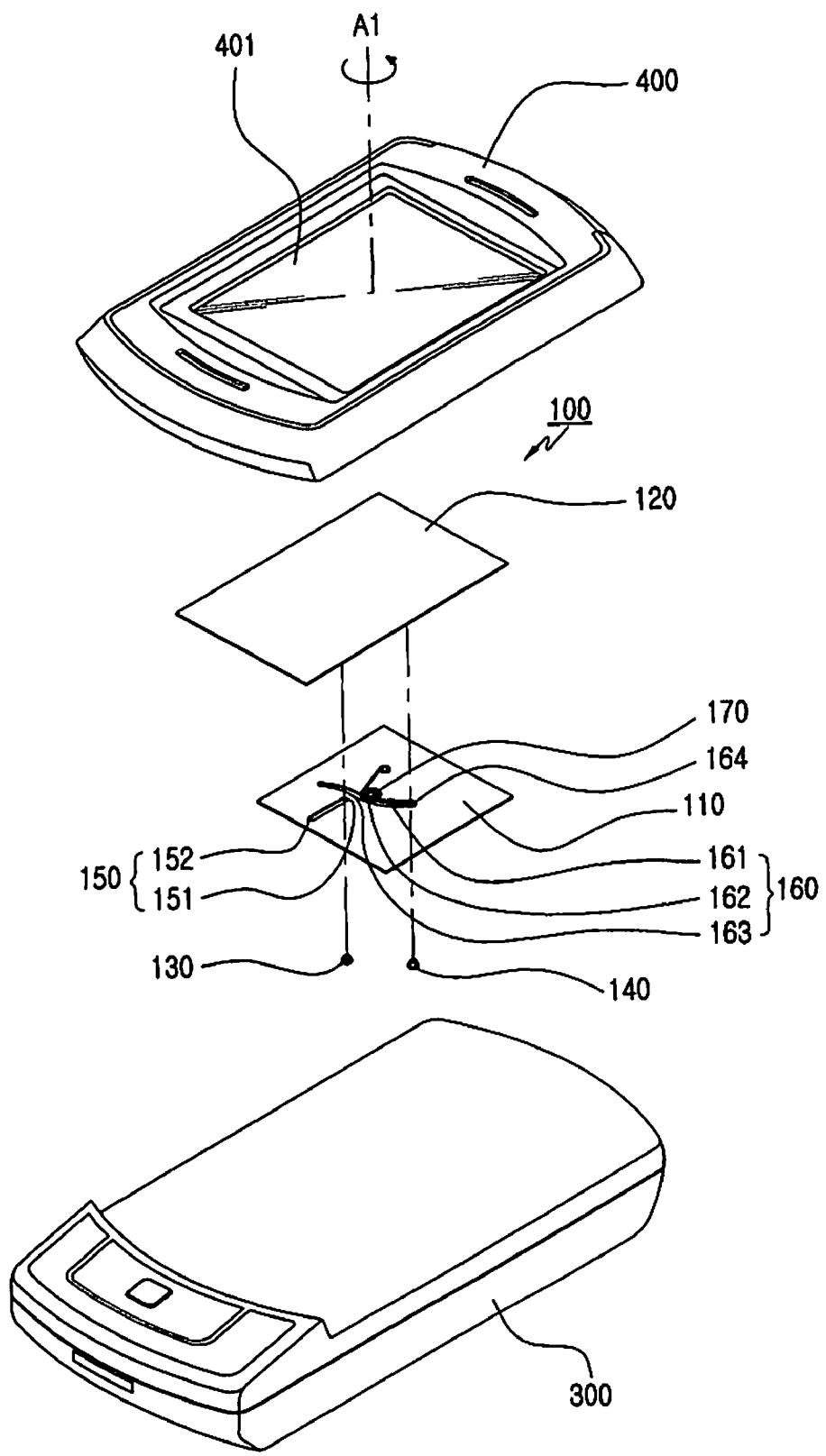
FIG. 19 is an exploded perspective view showing the configuration of the swing hinge device of a swing-type portable terminal according to as third embodiment of the present invention.

As shown in FIG. 19, the swing-type portable terminal includes a body housing 300, a display unit 401, and a swing housing 400 swinging on the upper surface of the body housing 300 while facing the body housing 300.

The swing hinge device 100 of the swing-type portable terminal includes a base member 110, a rotation member 120, first and second guide pins 130 and 140, first and second guide members 150 and 160, and power supply means 170.

The first and second guide pins 130 and 140 extend through first and second guide members 150 and 160 arranged on the base member 110, and are coupled to the rotation member 120.

The first and second guide members 150 and 160 include first and second guide holes, respectively.

The first and second guide members 150 and 160 are respectively provided with the power supply means 170. The power supply means 170 includes an elastic member 170, which has one end connected to the second guide pin 140 and the other end coupled to the base member 110.

In this state, the base member 110 is coupled to the body housing 300, and the rotation member 120 is coupled to the swing housing 400.

The swing housing 400 rotates from a portrait mode to a landscape mode.

At this time, the first guide pin 130 moves straightly along the first guide hole 150, and the second guide pin 140 moves in a curved direction along a first curved guide 161 of the second guide hole 160. When the first and second guide pins 130 and 140 move to the intermediate portions of the first and second guide holes 150 and 160, respectively, the second guide pin 140 passes by an inflection point 162 formed at the intermediate portion of the second guide hole 160, and moves along the second curved guide 163 formed to be opposite to the first curved guide 161. Simultaneously, the first guide pin 130 moves in a straight line along the first guide hole 150.

Figure 20:
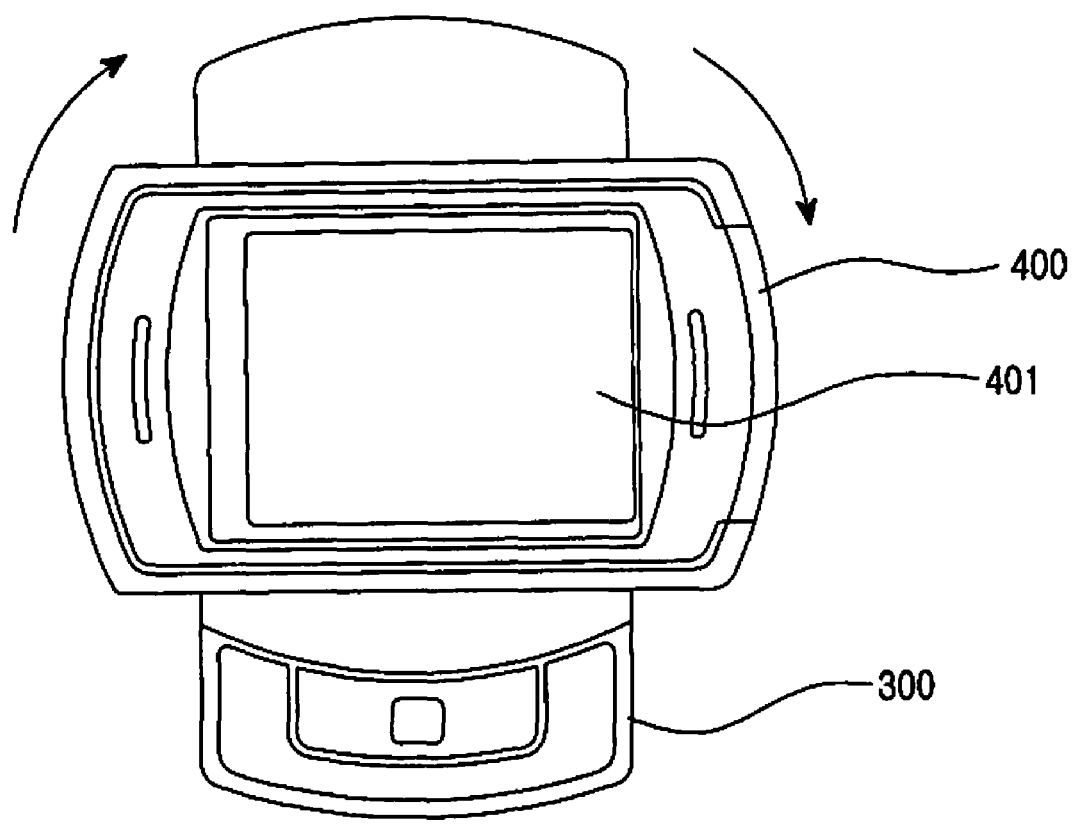
FIG. 20 is a front view showing the swing-type portable terminal according to the third embodiment of the present invention, in which the swing hinge devices rotates the swing body of the swing-type portable terminal.

As shown in FIG. 20, the swing housing 400 rotates by 90 degrees and is arranged in the landscape mode.

At this time, as shown in FIG. 19, the elastic member 170 provides elasticity for the first and second guide pins 130 and 140 so that the first and second guide pins 130 and 140 move straightly or curvedly along the first and second guide holes 150 and 160. The elastic member 170 moves together with the second guide pin 140 along the predetermined trajectory as the second guide pin 140 moves in a curved direction.

The second guide hole 160 has an 'S' shape, in which the second guide pin 140 can move in a curved direction.

The first guide hole 150 has a first stopper 151 formed at one end thereof, which makes contact with the first guide pin 130 and stops the straight movement of the first guide pin 130 at a position where the rotation of the swing housing 400 is terminated, and a second stopper 152 formed at the other end thereof, which stops the straight movement of the first guide pin 130 when the swing housing 400 rotates by 90 degrees. Thus, when the swing housing 400 rotates by 90 degrees, the first guide pin 130 simultaneously makes contact with the second stopper 152 and stops its straight movement.

At the same time, the second curved guide 163 has a second stopper 165 formed at one end thereof, which stops the swing housing 400 when the swing housing 400 rotates by 90 degrees. Similarly, when the swing housing rotates by 90 degrees, the second guide pin 140 makes contact with a first stopper 164 and stops its curved movement. Here, as shown in FIG. 20, when the swing housing 400 rotates from the landscape mode to the portrait mode, the swing housing 400 rotates about a hinge axis A1, shown in FIG. 19. The first and second guide pins 130 and 140 are released from the second stoppers 152 and 164, and the first guide pin 130 moves in a straight line along the first guide hole 150. In addition, the second guide pin 140 also moves in a curved direction along the second curved guide 163. Then, the first guide pin 130 makes contact with the first stopper 151 formed at one end of the first guide hole 150 and stops its straight movement.

At the same time, the second guide pin 140 passes by the inflection point 162 and moves in a curved direction along the first curved guide 161. Then, the second guide pin 140 makes contact with the first stopper 164 formed in the first curved guide 161 and stops its curved movement.

The elastic member 170 provides elasticity for the straight or curved movement of the first and second guide pins 130 and 140.

Hereinafter, the operation of the swing hinge device of the portable terminal constructed as described above according to a fourth embodiment of the present invention will be described in detail with reference to FIGS. 21 through 29.

Figure 21:
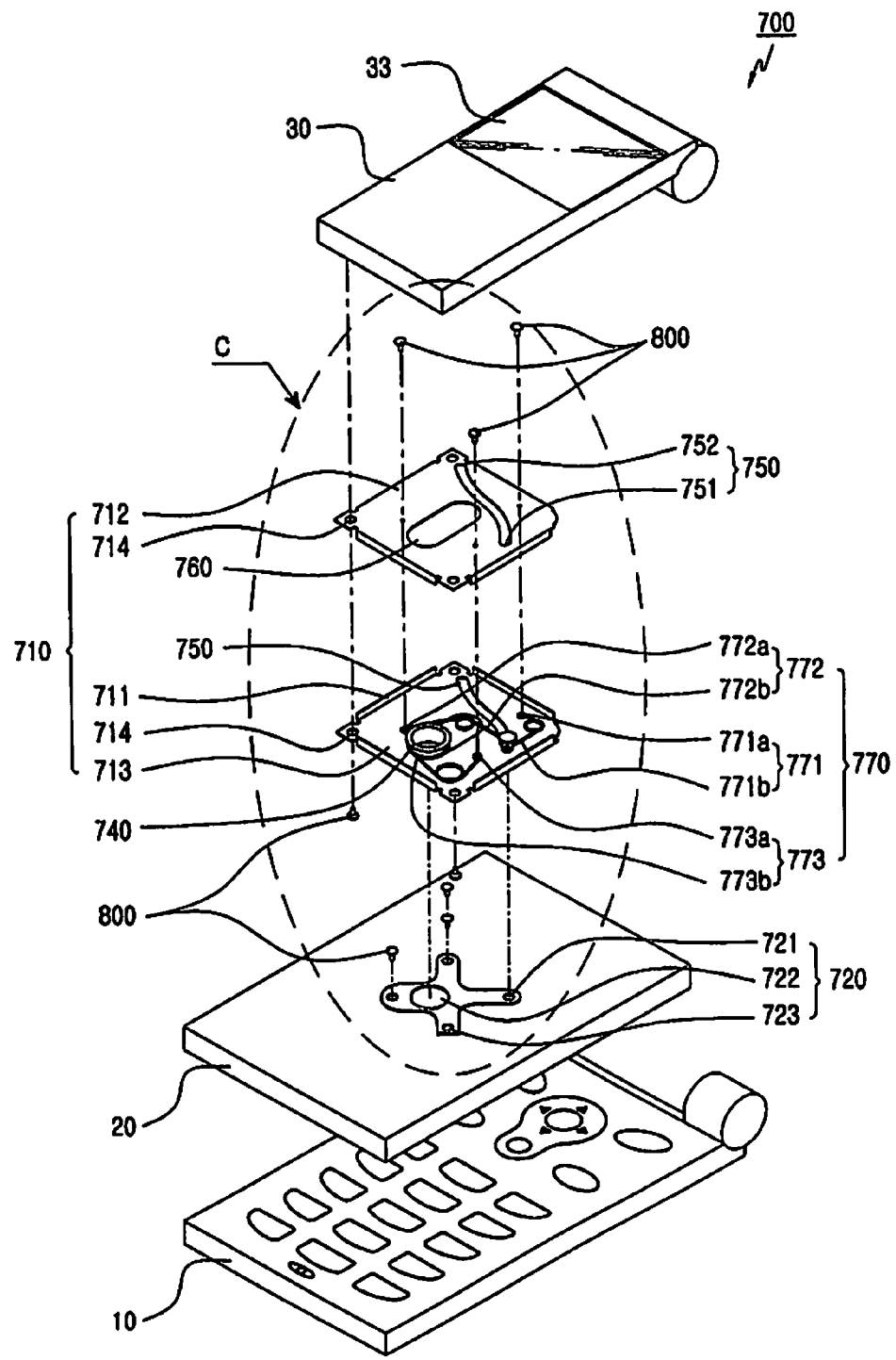
FIG. 21 is an exploded perspective view showing the configuration of a swing hinge device of a portable terminal according to a fourth embodiment of the present invention.
Figure 22:
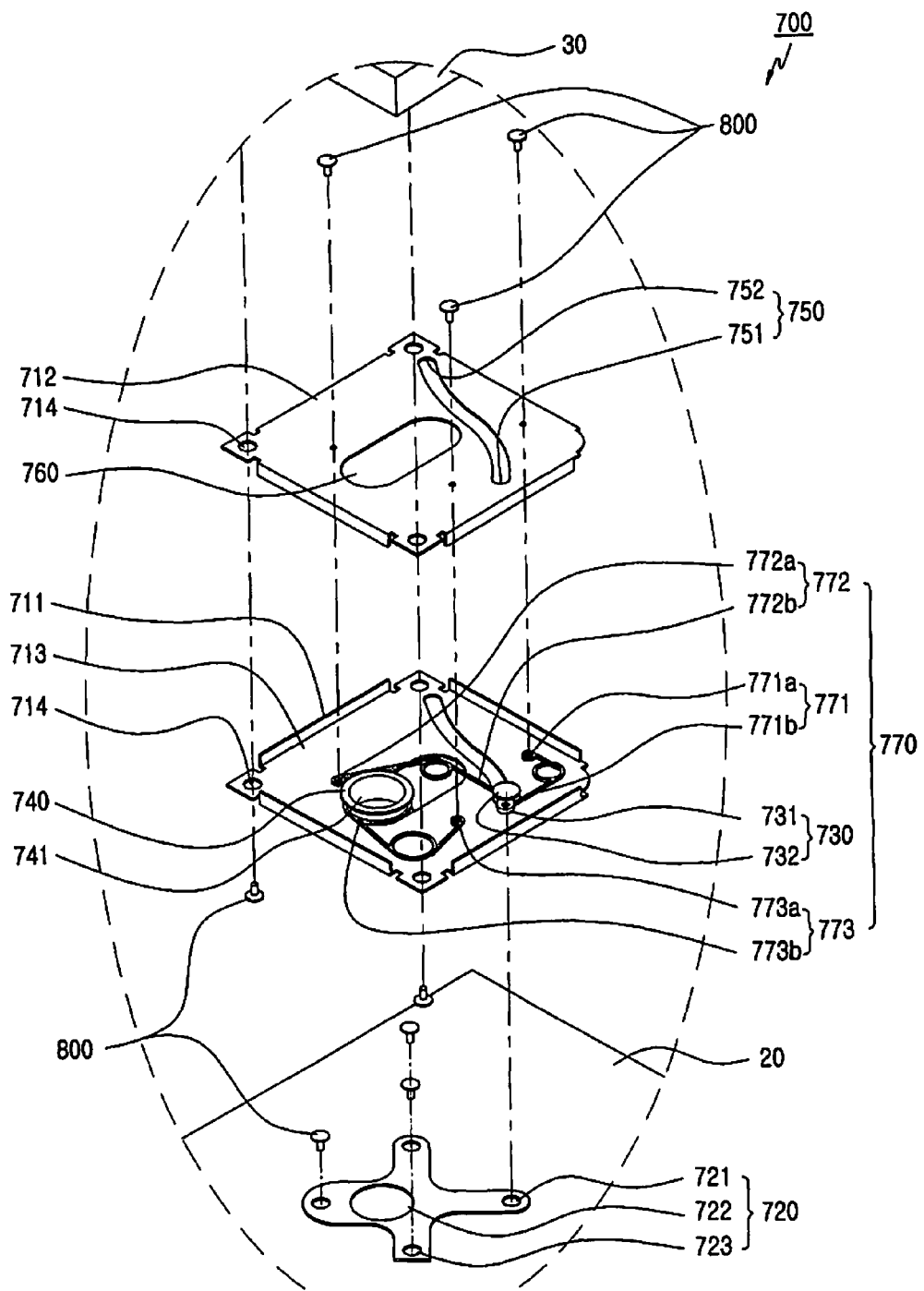
FIG. 22 is an exploded perspective view showing the swing hinge device marked by a circle C in FIG. 21.

As shown in FIGS. 21 and 22, the portable terminal includes a body housing 10, a folder 20, and a connection member 30.

As shown in FIGS. 21-25, the portable terminal has a swing hinge device including a base member 710, a rotation member 720, first and second guide pins 730 and 740, first and second guide members 750 and 760, and a number of force supply means 770. The first and second guide members 750 and 760 include first and second guide holes. The first guide hole 750 is curved, and the second guide hole 760 is straight. The force supply means 770 include first, second, and third elastic members 771, 772, and 773.

As shown in FIGS. 21-25, the base member 710 includes first and second planar members 711 and 712, which define a mounting space 713 so that the first and second guide pins 730 and 740, the first and second guide members 750 and 760, and the first, second, and third elastic members 771, 772, and 773 are mounted in the mounting space 713. The first and second guide pins 730 and 740 are coupled through the first and second guide members 750 and 760 formed on the base member 710. One end 771a of the first elastic member 771 is fastened to the first planar member 711, and the other end 771b is fastened to the first fastener 731 of the first guide pin 710. One end 772a of the second elastic member 772 is fastened to the first planar member 711, and the other end 772b is fastened to the second fastener 732 of the first guide pin 730. One end 773a of the third elastic member 773 is fastened to the first planar member 711, and the other end 773b is fastened to the second guide pin 740. The second guide pin 740 includes a cylindrical housing, the outer periphery of which is fastened to the other end of the third elastic member 773.

As shown in FIGS. 21 and 22, the first coupler 721 of the rotation member 720 is coupled to the first guide pin 730, which extends through the first guide member 750, and the second coupler 722 of the rotation member 720 is coupled to the second guide pin 740, which extends through the second guide member 760. In this state, the third coupler 723 of the rotation member 720 is coupled to the folder 20 by screws 800, and the fastener 714 of the base member 710 is coupled to the connection member 30 by screws 800.

As shown in FIGS. 21 and 22, the second guide pin 740 has a flexible circuit hole 741 formed therein so that a flexible circuit (not shown) extends through the hole 741. The connection member 30 has a connection member-side LCD 33 exposed to the outside. The rotation member 720 has the shape of "+".

Figure 23:
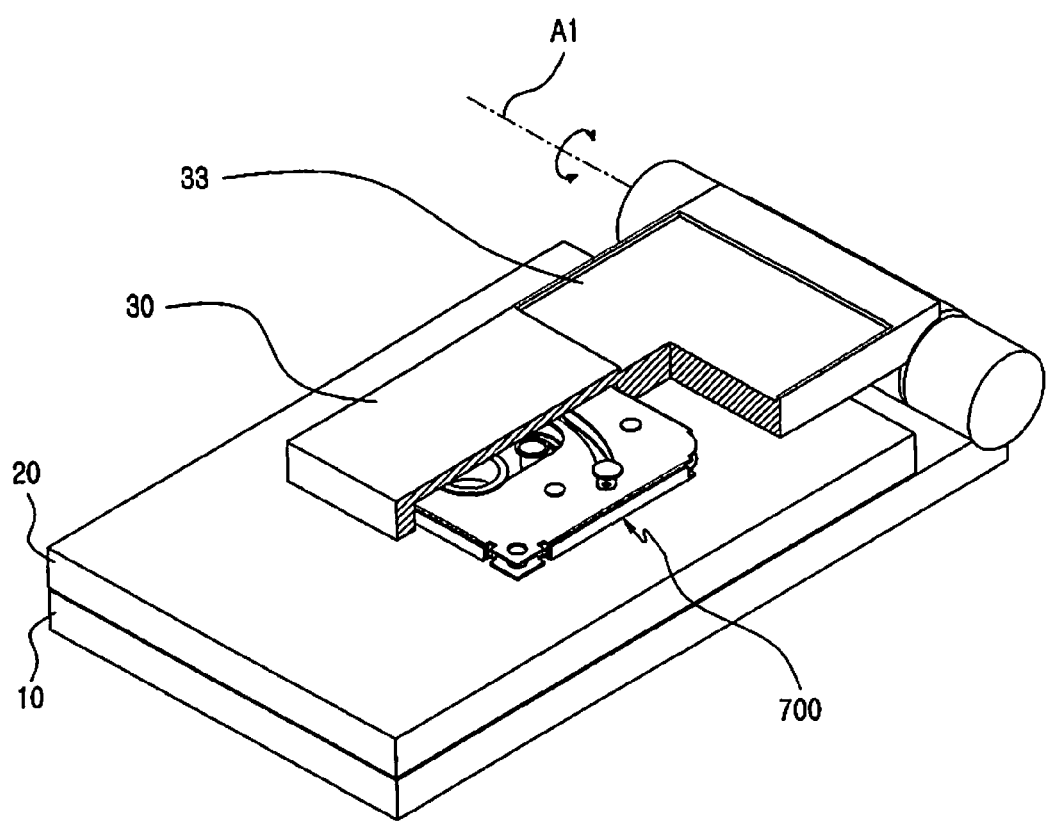
FIG. 23 is a partially broken perspective view showing the combination of the swing hinge device of the portable terminal according to the fourth embodiment of the present invention.
Figure 24:
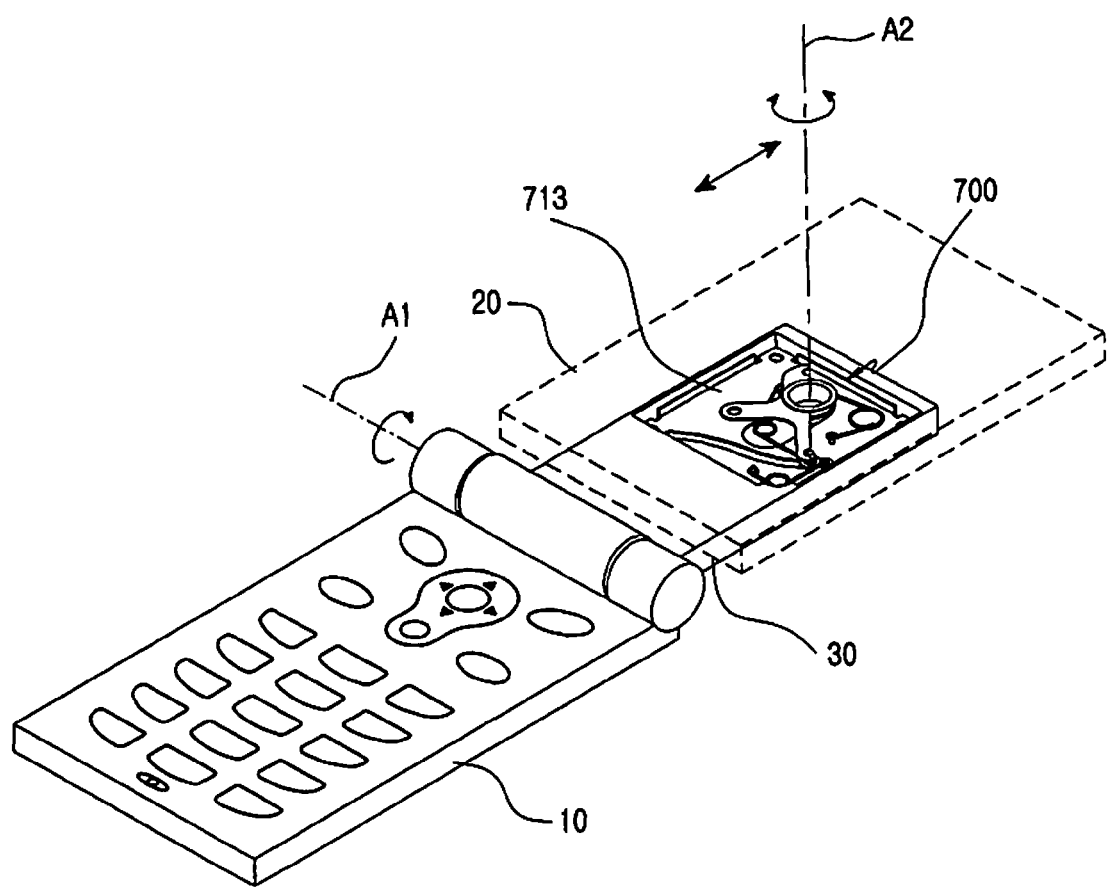
FIG. 24 is a perspective view showing the swing hinge device of the portable terminal according to the fourth embodiment of the present invention, in which the folder is open.
Figure 25:
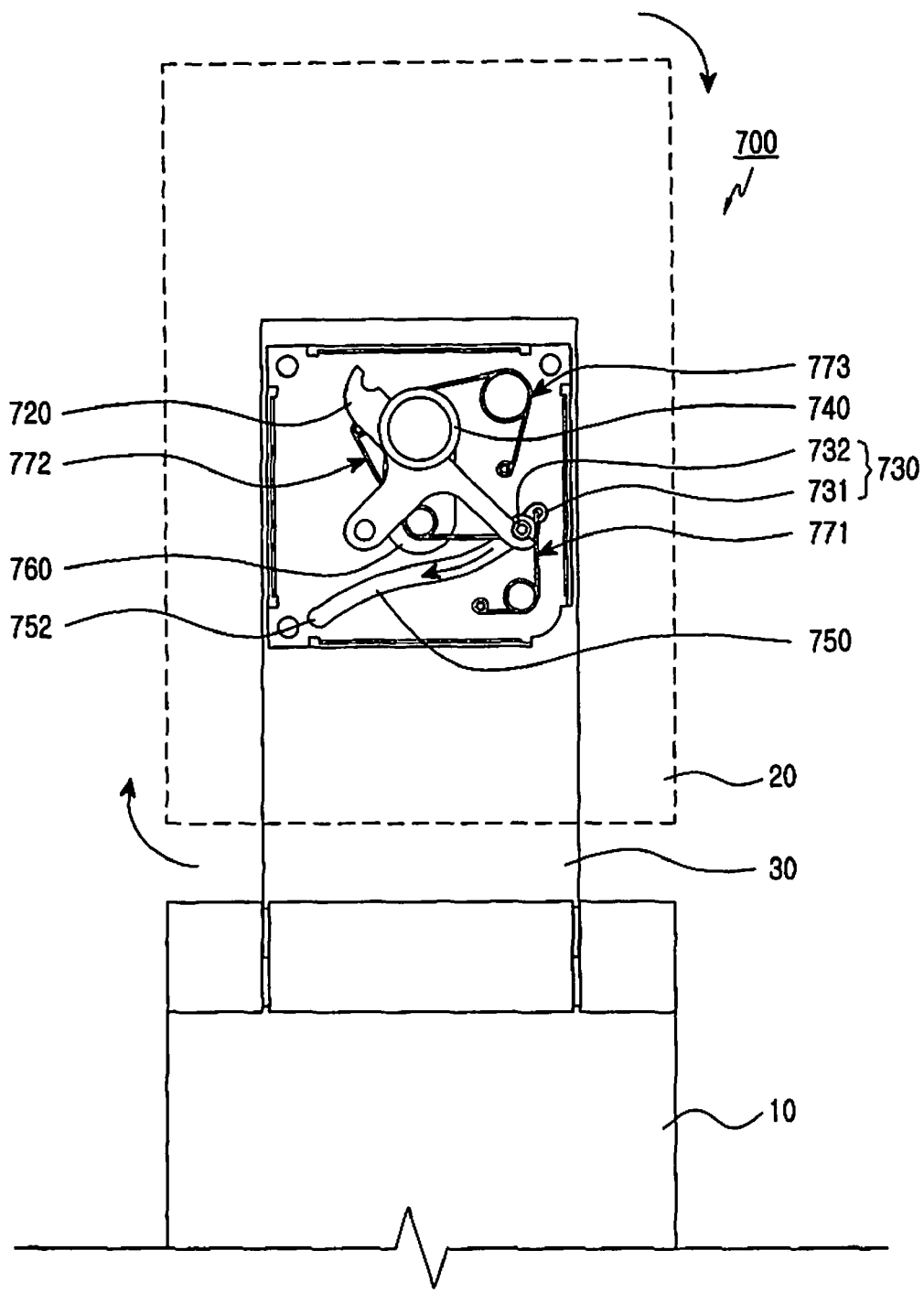
FIG. 25 is a front view showing the swing hinge device of the portable terminal according to the fourth embodiment of the present invention, in which the folder is open.

In this state, as shown in FIGS. 23, 24, and 25, the folder 20 is rotated away from the body housing 10 about the first hinge axis A1 of the connection member 30.

Figure 26:
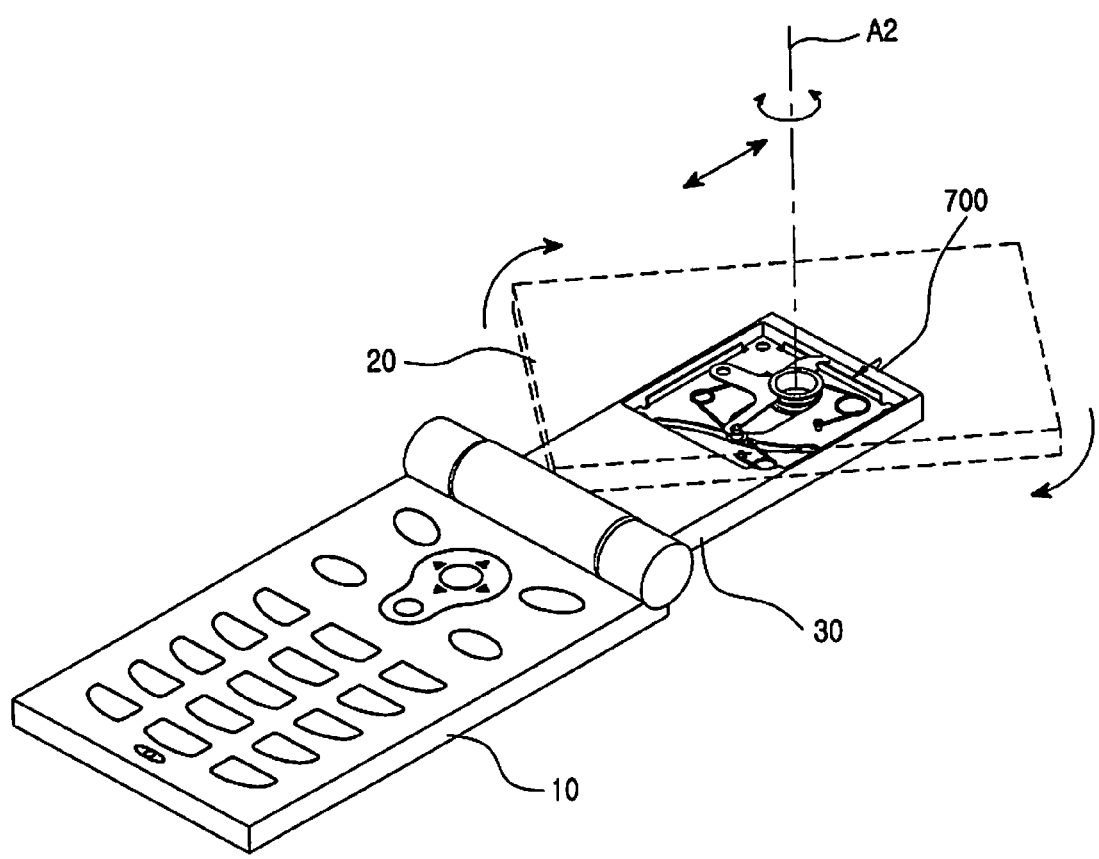
FIG. 26 is a perspective view showing the swing hinge device of the portable terminal according to the fourth embodiment of the present invention, in which the folder is rotated.
Figure 27:
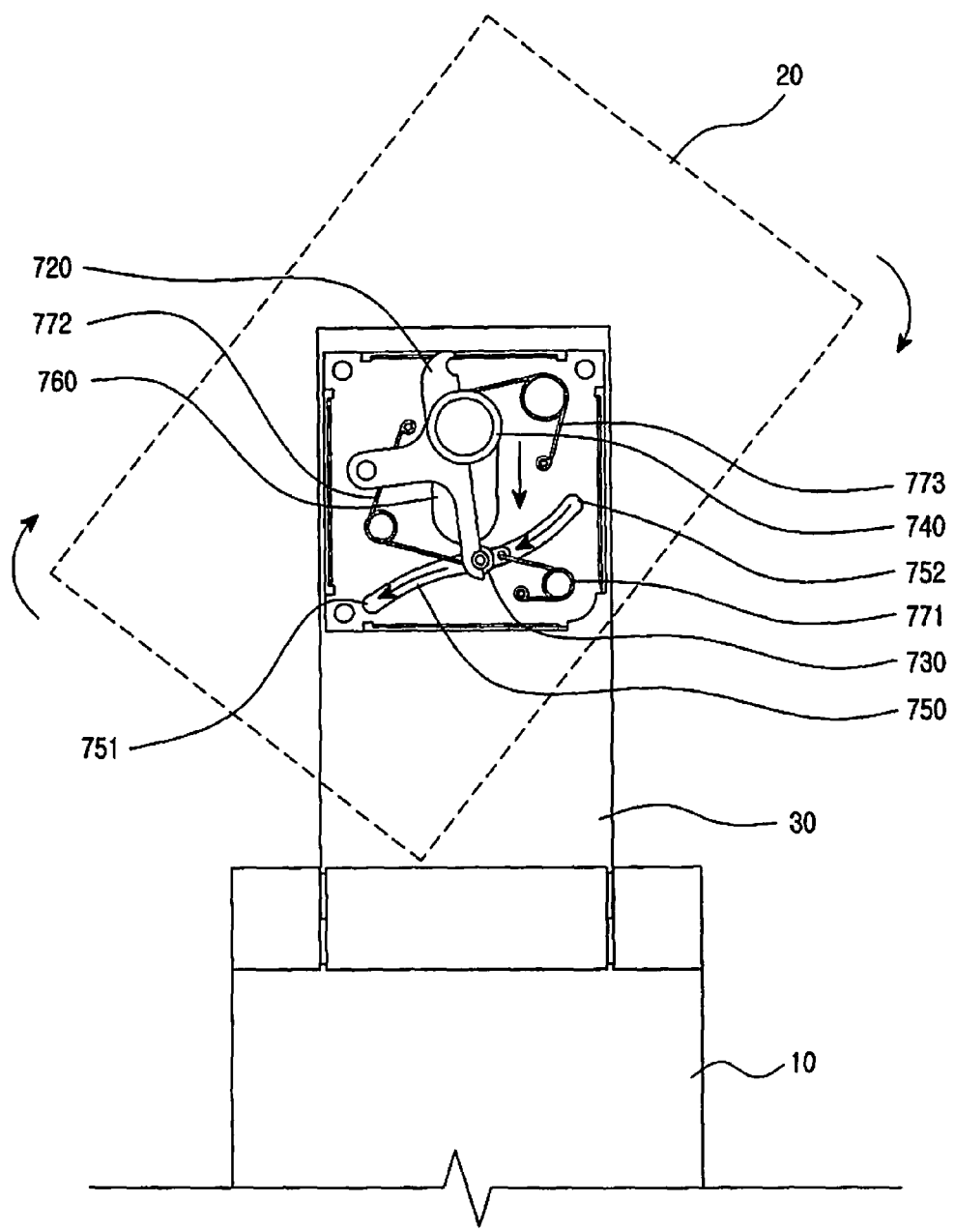
FIG. 27 is a front view showing the swing hinge device of the portable terminal according to the fourth embodiment of the present invention, in which the folder is rotated.

As shown in FIGS. 26 and 27, the folder 20 is rotated about the second hinge axis A2 so that the folder 20, which has been aligned in the longitudinal direction, is then positioned in the transverse direction.

The rotation member 720 rotates together, and so does the first guide pin 730.

As shown in FIG. 27, the first guide pin 730 semi-automatically moves along the curve of the first guide member 750 until it escapes from the first stopper 751 of the first guide member 750.

Figure 28:
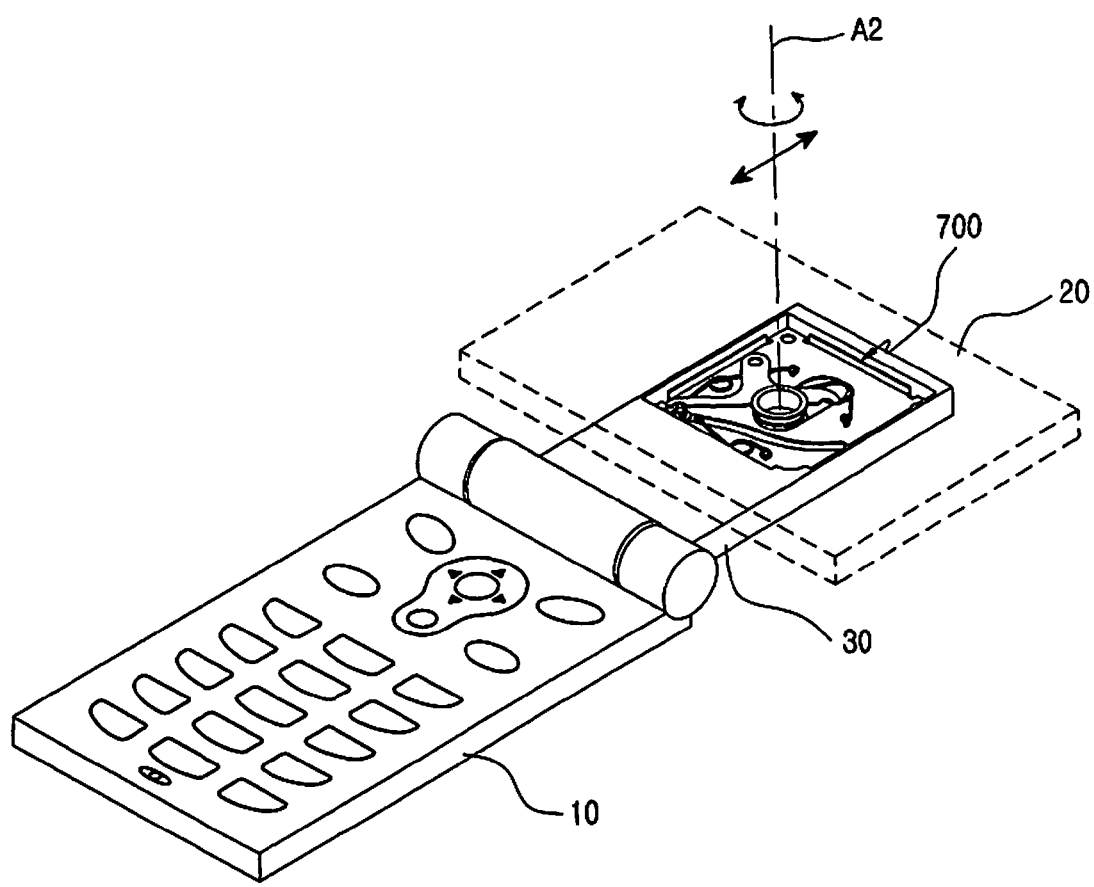
FIG. 28 is a perspective view showing the swing hinge device of the portable terminal according to the fourth embodiment of the preset invention, in which the folder is rotated at an angle of 90 degrees.
Figure 29:
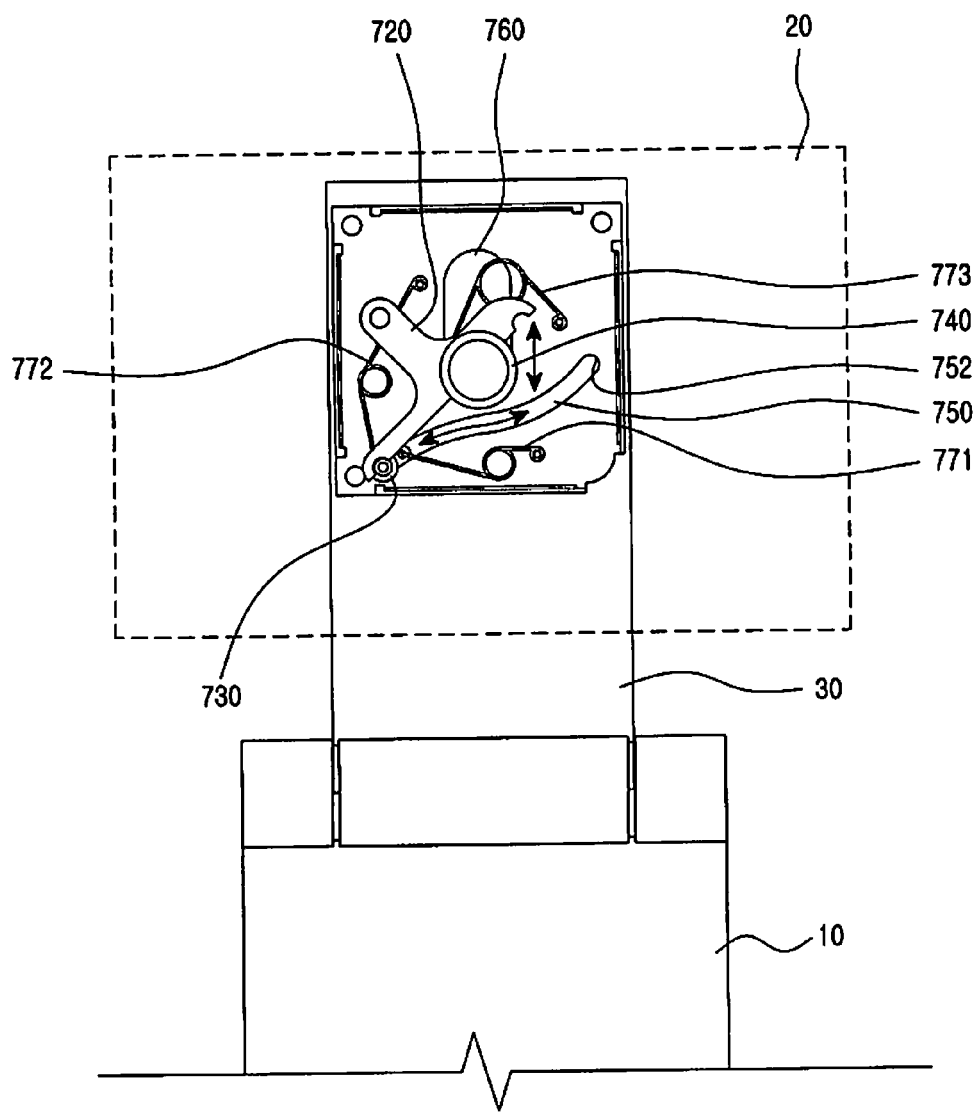
FIG. 29 is a front view showing the swing hinge device of the portable terminal according to the fourth embodiment of the present invention, in which the folder is rotated at an angle of 90 degrees.

As shown in FIGS. 28 and 29, after the first guide pin 730 moves along the curve of the first guide member 750 and reaches the center, the second guide pin 740 semi-automatically moves in a straight line along the second guide member 760. When the first guide pin 730 contacts the second stopper 752 of the first guide member 750, it stops moving along the curve. Then, the second guide pin 740 moves in a straight line. At the same time, the second hinge axis A2 moves together in a straight line. The folder 20 rotates about the second hinge axis A2.

As shown in FIG. 29, the folder rotates 90 degrees and lies in the transverse direction.

As shown in FIGS. 25, 26, and 27, the first and second elastic members 771 and 772 provide elastic force so that the first guide pin 730 can semi-automatically move along the curve. In addition, the third elastic member 773 provides elastic force so that the second guide pin 740 can semi-automatically move in a straight line.

As shown in FIGS. 24 and 25, the folder 20 is again rotated so that the folder 20, which has been lying in the transverse direction, is aligned in the longitudinal direction. Then, the first guide pin 730 escapes from the second stopper 752 and moves along the curve of the first guide member 750. After the guide pin 730 reaches the center of the first guide member 750, the second guide pin 740 moves in a straight line along the second guide member 760 until it returns to the original position.

The first and second guide pins 730 and 740 contact the first stopper 751, stop the first guide pin 730 from moving, and limit the rotation of the folder 20.

The first, second, and third elastic members 771, 772, and 773 provide elastic force so that the first and second guide pins 730 and 740 can semi-automatically move along a curve or in a straight line.

The swing hinge device 700 is provided on a dual connection member (not shown) for connecting the folder 20 so as to rotate about the first, second, and third hinge axes. The swing hinge device is applicable not only to a swing-type portable terminal (not shown), but also to every type of portable terminal.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A swing hinge device of a portable terminal including a body housing, a display unit, a folder rotating about first and second hinge axes on the body housing, and a connection member providing the first and second hinge axes and rotatably connecting the folder with the body housing so that the folder rotates about the first and second hinge axes, the swing hinge device comprising:
   a base member coupled to the connection member;
   a rotation member coupled to the folder;
   first and second guide pins provided on the rotation member;
   a first guide member disposed on the base member and coupled to the first guide pin, for guiding a straight movement of the first guide pin when the rotation member rotates about the second hinge axis;
   a second guide member disposed on the base member and coupled to the second guide pin, for guiding a curved movement of the second guide pin when the rotation member rotates about the second hinge axis, and moving the second hinge axis along with the second guide pin so that the display unit of the folder is located at a center portion of the connection member; and
   a power supply means interposed between the first and second guide members, for providing force for straight or curved movement of the first and second guide pins,
   wherein the second guide member includes a second guide hole through which the second guide pin extends, the second guide hole having a first curved guide formed to guide the curved movement of the second guide pin when the folder rotates, and a second curved guide formed opposite to the first curved guide so that the second guide pin moves along the first curved guide, passes by an inflection point of an intermediate portion of the second guide hole, and moves along the second curved guide.

2. The swing hinge device of the portable terminal as claimed in claim 1, wherein the first guide member includes a first guide hole through which the first guide pin extends, the first guide hole being linearly formed along the length of the folder, and having a first stopper formed at a first end of the first guide hole, which makes contact with the first guide pin and stops the straight movement of the first guide pin at a position where a rotation of the folder is terminated, and a second guide stopper formed at a second end of the first guide hole, which makes contact with and stops the first guide pin when the folder rotates 90 degrees.

3. The swing hinge device of the portable terminal as claimed in claim 1, wherein the second guide hole has an 'S' shape.

4. The swing hinge device of the portable terminal as claimed in claim 1, wherein the first curved guide has a first stopper formed at a first end of the second guide hole, which makes contact with and stops the second guide pin at a position where the rotation of the folder is terminated, and the second curved guide has a second stopper formed at a second end of the second guide hole, which makes contact with and stops the second guide pin when the folder rotates 90 degrees.

5. The swing hinge device of the portable terminal as claimed in claim 1, wherein the power supply means includes an elastic member, which has one end connected to the second guide pin and the other end coupled to the base member, the elastic member moving along a predetermined trajectory as the second guide pin moves.

6. A dual hinge device of a portable terminal including a body housing, a display unit, a folder rotating about first, second and third hinge axes on the body housing, and dual connection members providing the first, second and third hinge axes and rotatably connecting the folder with the body housing so that the folder rotates about the first, second and third hinge axes, the dual hinge device comprising:

base members coupled to the dual connection members, respectively;

rotation members coupled to the folder and the body housing, respectively;

first and second guide pins provided on each rotation member;

first guide members disposed on the base members and coupled to the first guide pins, for guiding a straight movement of the first guide pins when the rotation members rotate about the second and third hinge axes;

second guide members disposed on the base members and coupled to the second guide pins, for guiding a curved movement of the second guide pins when the rotation members rotate about the second and third hinge axes, and moving the second and third hinge axes along with the second guide pins so that the body housing and the folder are located at center portions of the connection members, respectively; and power supply means interposed between the first and second guide members, for providing force for straight or curved movement of the first and second guide pins, wherein the second guide members include a second guide hole through which the second guide pins extend, the second guide hole having a first curved guide formed to guide the curved movement of the second guide pins when the folder rotates, and a second curved guide formed opposite to the first curved guide so that the second guide pins move along the first curved guide, passes by an inflection point of an intermediate portion of the second guide hole, and moves along the second curved guide.

7. The dual hinge devices of the portable terminal as claimed in claim 6, wherein the dual connection members include first, second and third connection members, the first connection member providing the first hinge axis and rotatably connecting the folder to the body housing, the second connection member providing the second hinge axis, and the third connection member providing the third hinge axis, wherein, when the folder rotates about the second hinge axis, the first guide pin is moved along a straight line by the first guide member, and in addition the second guide pin is moved in a curved direction by the second guide member so as to move the second hinge axis of the folder, resulting in the rotation of the folder by 90 degrees, and wherein, when the body housing rotates about the third hinge axis, the first guide pin is along a straight line moved by the first guide member, and in addition the second guide pin is a curved direction moved by the second guide member so as to move the third hinge axis of the body housing, resulting in the rotation of the body housing by 90 degrees.

8. The dual hinge devices of the portable terminal as claimed in claim 6, wherein, when the body housing and the folder move in a straight line or in a curved direction about the second and third hinge axes, the body housing and the folder are arranged in a shape of 'H' rotated by 90 degrees.

9. A swing hinge device of a portable terminal including a body housing, a display unit, and a swing housing swinging on the body housing while facing the body housing, the swing hinge device comprising:

a base member coupled to the body housing;

a rotation member coupled to the swing housing;

first and second guide pins provided on the rotation member;

a first guide member disposed on the base member and coupled to the first guide pin, for guiding a straight movement of the first guide pin when the rotation member rotates about a hinge axis;

a second guide member disposed on the base member and coupled to the second guide pin, for guiding a curved movement of the second guide pin when the rotation member rotates about the hinge axis, and moving the second hinge axis along with the second guide pin so that the display unit of the swing housing is located at a center portion of the body housing; and power supply means interposed between the first and second guide members, for providing force for straight or curved movement of the first and second guide pins, wherein the second guide member includes a second guide hole through which the second guide pin extends, the second guide hole having a first curved guide formed to guide the curved movement of the second guide pin when the folder rotates, and a second curved guide formed opposite to the first curved guide so that the second guide pin moves along the first curved guide, passes by an inflection point of an intermediate portion of the second guide hole, and moves along the second curved guide.

10. A swing hinge device of a portable terminal including a body housing, a display unit, a folder rotating about a hinge axis on the body housing, the swing hinge device comprising:

a base member;

a rotation member;

first and second guide pins provided on the rotation member; and first and second guide members disposed on the base member and coupled to the first and second guide pins, for guiding straight movement of the first and second guide pins when the rotation member rotates about second hinge axis, and also for guiding a curved movement of the hinge axis along with the first and second guide pins so that the display unit of the folder is located at a center portion of the body housing, wherein the second guide member includes a second guide hole through which the second guide pin extends, the second guide hole having a first curved guide formed to guide the curved movement of the second guide pin when the folder rotates, and a second curved guide formed opposite to the first curved guide so that the second guide pin moves along the first curved guide, passes by an inflection point of an intermediate portion of the second guide hole, and moves along the second curved guide.

11. A swing hinge device of a portable terminal comprising a body housing, a display unit, a folder adapted to rotate away from the body housing about first and second hinge axes, and a connection member providing the first and second hinge axes and connecting the folder so as to rotate about the first and second hinge axes, the swing hinge device comprising:

a base member fastened to the connection member;

a rotation member fastened to the folder;

first and second guide pins coupled to the rotation member through the base member;

first and second guide members provided on the base member so that, when the rotation member is rotated about the second hinge axis, the first guide pin is semi-automatically moved along a curve and the second guide pin is semi-automatically moved in a straight line;

a number of force supply means positioned inside the base member and coupled to the first and second guide pins to provide force so that the first and second guide pins semi-automatically move along the curve or in the straight line, wherein the second guide member includes a second guide hole through which the second guide pin extends, the second guide hole having a first curved guide formed to guide the curved movement of the second guide pin when the folder rotates, and a second curved guide formed opposite to the first curved guide so that the second guide pin moves along the first curved guide, passes by an inflection point of an intermediate portion of the second guide hole, and moves along the second curved guide.

12. The swing hinge device as claimed in claim 11, wherein the base member comprises first and second planar members, a mounting space is defined between the first and second planar members so that the first and second guide pins, the first and second guide members, and the force supply means are mounted in the mounting space, and at least one fastener is formed on the first and second planar members and screw-fastened to the connection member.

13. The swing hinge device as claimed in claim 11, wherein the rotation member comprises:

a first coupler for coupling the first guide pin to the first guide member while extending through the first guide member;

a second coupler formed in a position adjacent to the first coupler to couple the second guide pin to the second guide member while extending through the second guide member; and at least one third coupler formed in a position adjacent to the second coupler and screw-coupled to the folder.

14. The swing hinge device as claimed in claim 11, wherein the rotation member has a "+" shape.

15. The swing hinge device as claimed in claim 11, wherein the first guide member comprises a first guide hole so that the first guide pin extends through the first guide hole and, when the folder is rotated, the first guide pin is guided to move along the curve, and the first guide hole has a first stopper formed on one end of the first guide hole to contact the first guide pin and stop curved movement in a position, rotation of the folder ending in the position, and a second stopper formed on another end of the first guide hole to contact the first guide pin and stop the folder after rotating 90 degrees.

16. The swing hinge device as claimed in claim 15, wherein the first guide hole is curved.

17. The swing hinge device as claimed in claim 11, wherein the second guide member comprises a second guide hole formed in a longitudinal direction of the folder so that the second guide pin extends through the second guide hole and, when the folder is rotated and when the first guide pin moves along the curve by means of the first guide member and reaches a center of the first guide member, the second guide pin is guided to move in the straight line.

18. The swing hinge device as claimed in claim 12, wherein the force supply means comprise first, second, and third elastic members, the first elastic member has a first end of the first elastic member screw-fastened to the first planar member and a second end of the first elastic member fastened to the first guide pin so that, when the first guide pin moves along the curve, the first elastic member rotates and moves together along a first predetermined trajectory and provides an elastic force necessary for a semi-automatic curved movement of the first guide pin, the second elastic member has a first end of the second elastic member screw-fastened to the first planar member and a second end of the second elastic member fastened to the first guide pin so that, when the first guide pin moves along the curve, the second elastic member rotates and moves together along a second predetermined trajectory and provides elastic force necessary for the semi-automatic curved movement of the first guide pin, and the third elastic member has a first end of the third elastic member screw-fastened to the first planar member and a second end of the third elastic member fastened to the second guide pin so that, when the second guide pin moves in the straight line, the third elastic member rotates and moves together along a third predetermined trajectory and provides elastic force necessary for a semi-automatic curved movement of the second guide pin.

19. The swing hinge device as claimed in claim 18, wherein the first guide pin comprises:
- a first fastener provided on a first end of the first guide pin and fastened to the second end of the first elastic member; and
- a second fastener provided on a second end of the first guide pin and fastened to the second end of the second elastic member.

20. The swing hinge device as claimed in claim 18, wherein the second guide pin comprises a cylindrical housing, and the second end of the third elastic member is fastened to an outer periphery of the cylindrical housing.

21. The swing hinge device as claimed in claim 11, wherein a flexible circuit hole is formed in the second guide pin so that a flexible circuit extends through the flexible circuit hole.

22. The swing hinge device as claimed in claim 11, wherein the connection member has a connection member-side liquid crystal display unit exposed to an outside of the connection member.

* * * * *